United States Patent
Horn et al.

(10) Patent No.: US 12,041,574 B2
(45) Date of Patent: Jul. 16, 2024

(54) POSITIONING IN A WIRELESS NETWORK USING A REPEATER

(71) Applicant: QUALCOMM Incorporated, San Diego, CA (US)

(72) Inventors: Gavin Bernard Horn, La Jolla, CA (US); Sven Fischer, Nuremberg (DE); Punyaslok Purkayastha, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 376 days.

(21) Appl. No.: 17/485,456

(22) Filed: Sep. 26, 2021

(65) Prior Publication Data

US 2023/0097862 A1    Mar. 30, 2023

(51) Int. Cl.
| | |
|---|---|
| *H04W 64/00* | (2009.01) |
| *H04B 7/155* | (2006.01) |
| *H04L 5/00* | (2006.01) |
| *H04W 4/029* | (2018.01) |

(52) U.S. Cl.
CPC ........ *H04W 64/00* (2013.01); *H04B 7/15507* (2013.01); *H04L 5/0051* (2013.01); *H04W 4/029* (2018.02)

(58) Field of Classification Search
CPC ..... H04W 64/00; H04W 4/029; H04W 16/26; H04B 7/15507; H04B 7/155; H04L 5/0051; G01S 13/765
See application file for complete search history.

(56) References Cited

U.S. PATENT DOCUMENTS

| | | | |
|---|---|---|---|
| 2021/0120517 A1 | 4/2021 | Akkarakaran et al. | |
| 2022/0070819 A1* | 3/2022 | Barbu | G01S 7/0235 |
| 2023/0388839 A1* | 11/2023 | Lyazidi | H04W 64/00 |

FOREIGN PATENT DOCUMENTS

WO    WO-2021062850 A1 *   4/2021

OTHER PUBLICATIONS

International Search Report and Written Opinion—PCT/US2022/075324—ISA/EPO—Nov. 29, 2022.

* cited by examiner

*Primary Examiner* — Umair Ahsan
(74) *Attorney, Agent, or Firm* — Weaver Austin Villenueve & Sampson LLP

(57) ABSTRACT

Techniques described herein are directed to improving the positioning of a target user equipment (UE) using an enhanced repeater disposed in a wireless network. In some embodiments, the enhanced repeater may include logically distinct user equipment (UE) functionality and distributed unit (DU) functionality. The UE functionality may enable setup with other entities of the network, e.g., an upstream location management function (LMF), such that the enhanced repeater is recognized as capable of positioning. The DU functionality may enable generation of downlink positioning signals (e.g., DL-PRS) at the enhanced repeater so as to obviate relaying of DL-PRS generated elsewhere in the network. The enhanced repeater may perform uplink measurements based on uplink positioning signals receive from the target UE, and report the uplink measurements to the LMF, enabling the LMF to calculate the position of the UE with fewer errors than if the uplink positioning signals were simply relayed.

30 Claims, 16 Drawing Sheets

POSITIONING IN A WIRELESS NETWORK USING A REPEATER

BACKGROUND

1. Field of Disclosure

Aspects of the present disclosure generally relate to the field of wireless communications, particularly determining a location of a mobile User Equipment (UE) using positioning signals exchanged via a wireless data network.

2. Description of Related Technology

The determination of a position of a mobile UE in a wireless communication network, often referred to as "positioning" of the UE, may be performed using downlink and/or uplink signals exchanged via portions of a wireless communication infrastructure. Signal repeaters may be strategically positioned within the network infrastructure to amplify signal power and/or extend the reach of base stations deployed within the network. However, the usage of repeaters for transmitting and receiving positioning signals can create delays that can cause errors in positioning of the UE.

BRIEF SUMMARY

To above ends, solutions are described herein to, among other things, improve the transmission and receipt of positioning signals in a wireless network via an enhanced signal repeater. More specifically, solutions configured to alleviate measurement errors caused by delays when positioning signals are relayed to or from a UE via an enhanced repeater are described herein.

In one aspect of the present disclosure, a method for positioning a target user equipment (UE) to be served by an enhanced repeater is disclosed. In some embodiments, the enhanced repeater includes a user equipment (UE) modem and a distributed unit (DU), and the method includes: performing setup with a location management function (LMF) of the network using the UE modem of the enhanced repeater; providing one or more downlink positioning signals generated by the DU of the enhanced repeater to the target UE; receiving one or more uplink positioning signals from the target UE via the DU of the enhanced repeater; performing one or more uplink measurements based on the received one or more uplink positioning signals; and reporting the one or more uplink measurements to the LMF via a gNodeB (gNB), the one or more uplink measurements configured to enable the LMF to determine a position of the target UE.

In another aspect of the present disclosure, an enhanced repeater is disclosed. In some embodiments, the enhanced repeater includes: at least one wireless communication interface; memory; a distributed unit (DU); a user equipment (UE) modem; and one or more processors communicatively coupled to the at least one wireless communication interface, the DU, the UE modem, and the memory, and configured to: perform setup with a location management function (LMF) of a network using the UE modem of the enhanced repeater; provide one or more downlink positioning signals generated by the DU of the enhanced repeater to a target UE to be served by the enhanced repeater; receive one or more uplink positioning signals from the target UE via the DU of the enhanced repeater; perform one or more uplink measurements based on the received one or more uplink positioning signals; and report the one or more uplink measurements to the LMF via a gNodeB (gNB), the one or more uplink measurements configured to enable the LMF to determine a position of the target UE.

In some embodiments, the enhanced repeater includes: means for performing setup with a location management function (LMF) of a network using a user equipment (UE) modem of the enhanced repeater; means for providing one or more downlink positioning signals generated by a distributed unit (DU) of the enhanced repeater to a target UE; means for receiving one or more uplink positioning signals from the target UE via the DU of the enhanced repeater; means for performing one or more uplink measurements based on the received one or more uplink positioning signals; and means for reporting the one or more uplink measurements to the LMF via a gNodeB (gNB), the one or more uplink measurements configured to enable the LMF to determine a position of the target UE.

In another aspect of the present disclosure, a non-transitory computer-readable apparatus is disclosed. In some embodiments, the non-transitory computer-readable apparatus includes a storage medium, the storage medium including a plurality of instructions configured to, when executed by one or more processors, cause an enhanced repeater to: perform setup with a location management function (LMF) of a network using a user equipment (UE) modem of the enhanced repeater; provide one or more downlink positioning signals generated by a distributed unit (DU) of the enhanced repeater to a target UE to be served by the enhanced repeater; receive one or more uplink positioning signals from the target UE via the DU of the enhanced repeater; perform one or more uplink measurements based on the received one or more uplink positioning signals; and report the one or more uplink measurements to the LMF via a gNodeB (gNB), the one or more uplink measurements configured to enable the LMF to determine a position of the target UE.

BRIEF DESCRIPTION OF THE DRAWINGS

Aspects of the present disclosure are illustrated by way of example in the accompanying figures.

Like reference symbols in the various drawings indicate like elements, in accordance with certain example implementations.

Figure 1A:
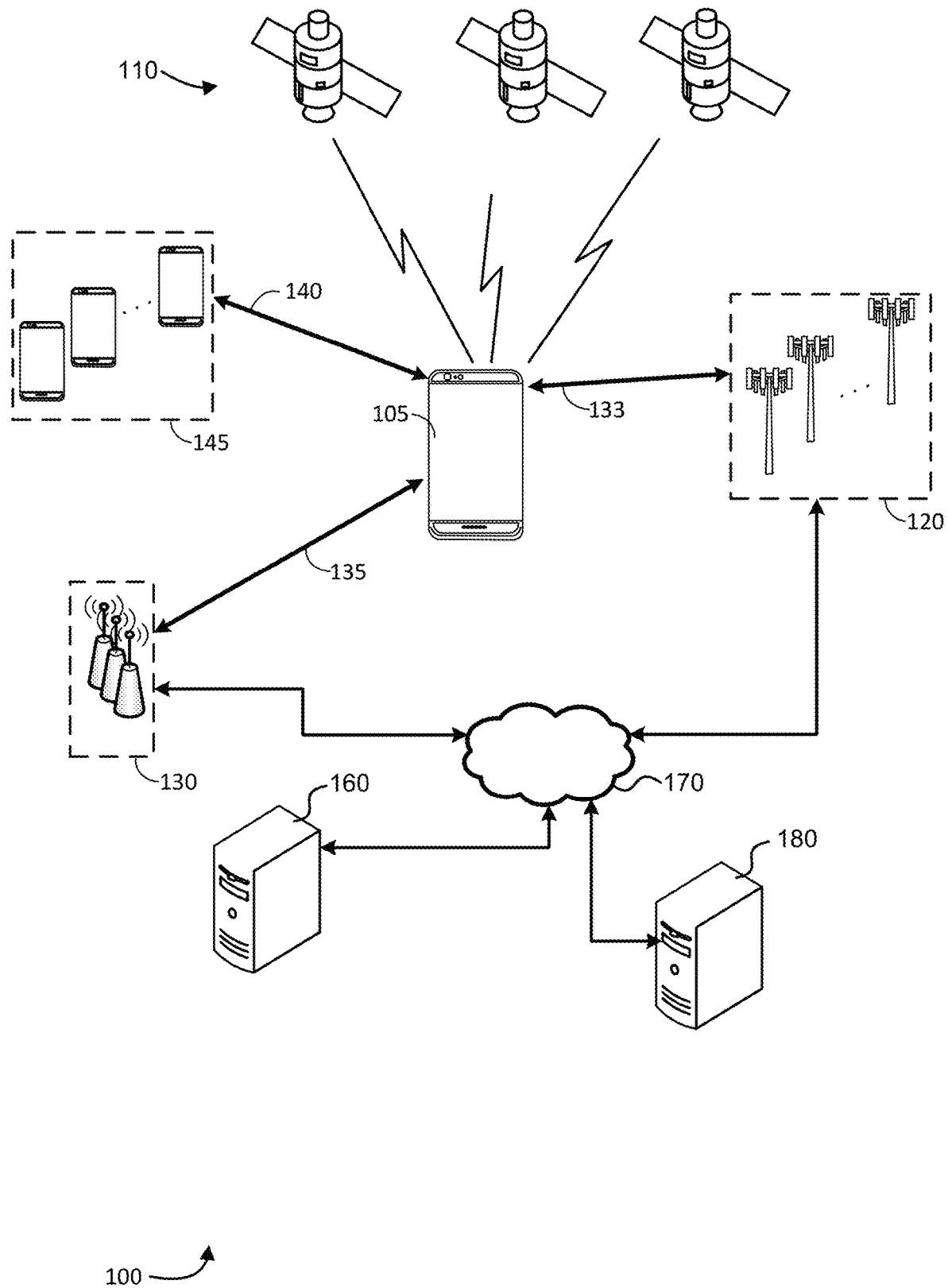
FIG. 1a illustrates a diagram of an exemplary embodiment of a positioning system that may be useful with one or more embodiments of the present disclosure.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure or the spirit of the appended claims.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Additionally, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

As will be discussed in more detail below, positioning techniques for determining a location of a UE may involve exchange of downlink and/or uplink signals via one or more base stations of a wireless communication network, including one or more node B, Evolved Node B (eNB), Next Generation eNB (ng-eNB), and/or Next Generation NodeB (gNB). In addition, a Location Management Function (LMF) disposed within the core network of the wireless communication network may configure signals (e.g., Positioning Reference Signals (PRS)) that are transmitted through the network to support the position determination of the UE.

Fifth Generation New Radio (5G NR) networks are one type of network that may benefit from use of repeaters, particularly in locations where direct line of sight to the antennas may be necessary, e.g., where a short-range millimeter wave (mmWave) spectrum is used and the base station is not reachable by the UE. Further, deployment of repeaters is often more flexible than installation of towers and similar types of base stations in an existing infrastructure.

As alluded to above, the relaying of positioning signals may create delay issues because the UE cannot distinguish whether a downlink signal is coming from a base station or from a repeater. For example, when a downlink signal travels through a repeater, this results in an additional delay that may not be accounted for by the UE and can create significant position errors or non-convergence of the position solution. Moreover, one assumption for uplink positioning is that the repeater would have its own Location Measurement Unit (LMU); however, in many current networks, the LMU is located in the backend, e.g., in the core network. Thus, delays incurred as the uplink signals travels to the backend also may not be accounted for during positioning of the UE. Hence, UE positioning in a network having typical repeaters is prone to errors or delays from the assumption or the need to relay positioning signals between the UE and the core network. To this end, solutions that eliminate delays and errors are disclosed.

FIG. 1a is a simplified illustration of a positioning system 100 in which a UE 105, location server 160, and/or other components of the positioning system 100 can use the techniques provided herein for positioning of a UE by an enhanced (or "smart") positioning-only repeater, and configuration of the enhanced repeater for positioning of user equipment (e.g., a mobile device), according to embodiments. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1a provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1a. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be configured to be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

Figure 1B:
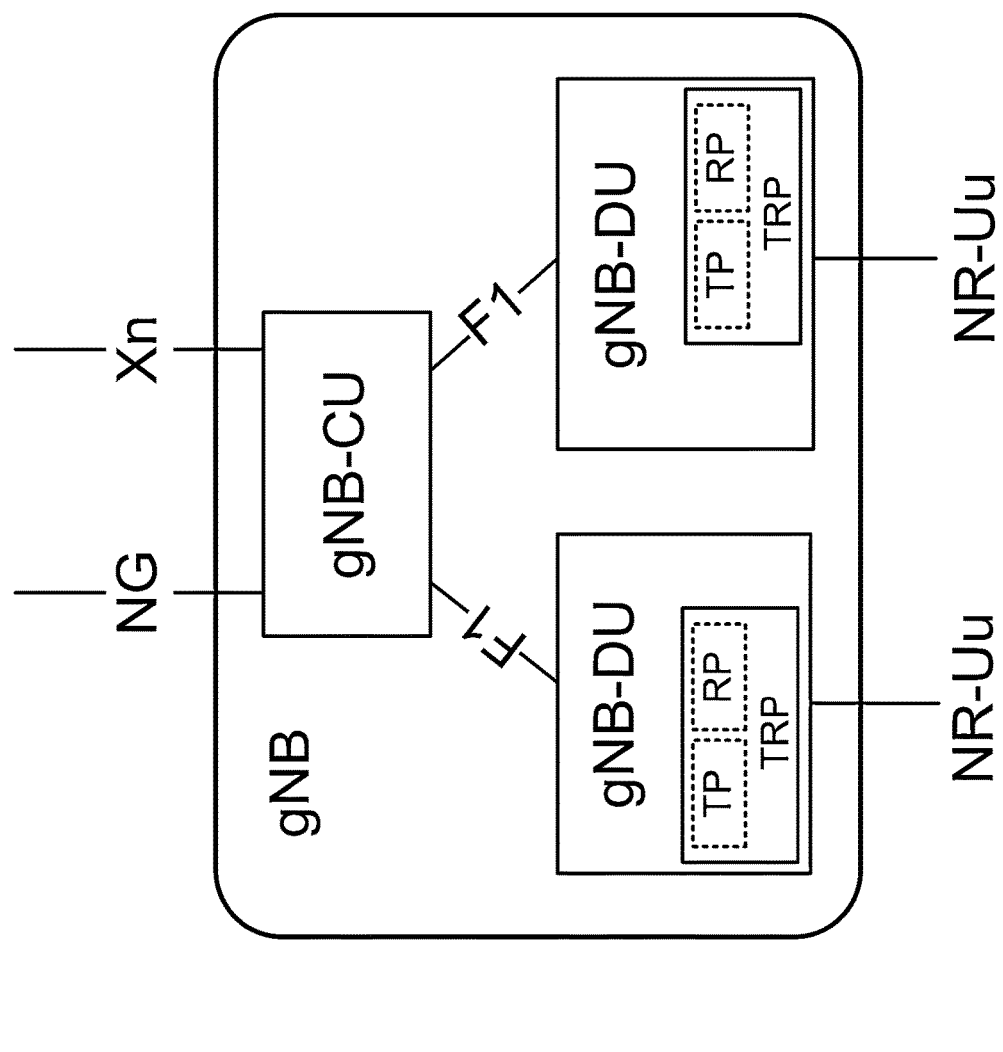
FIG. 1b illustrates a diagram of an example split between a distributed unit (DU) and a Transmission Reception Point (TRP) residing within the DU, and a central unit (CU) within a gNodeB (gNB).

A gNB may include at least one distributed unit (DU) and at least one central unit (CU), the latter of which may also be referred to as a centralized unit. In many embodiments, the DU and CU are logical nodes that provide respective functionalities, and a gNB is functionally split into the DU and CU, as shown in FIG. 1b. This split architecture enables the NR network to flexibly utilize different protocol stacks between CUs and DUs depending on design or resource availability. DUs and CUs may include varying subsets of gNB functions depending on the chosen functional split option, of which there are eight (8). Generally, a CU may be configured to perform various functions such as transfer of user data, mobility control, radio access network sharing, positioning, and/or session management. Signaling between a CU and the LMF is specified in NR Positioning Protocol A (NRPPa) in TS 38.455 of 3GPP Release 15, which is further described below. The CU may control operations of the DU but may not be able to perform functions designated to the DU. A DU typically resides closer to the edge of a network, near the end user. The DU may be configured for data communication with a fixed wireless terminal (FWT) or other radio units that communicate directly with a UE or another radio unit. The communication interface between a CU and DU may be referred to as a F1 interface, which can support control plane and user plane functionalities via F1-C and F1-U portions of the F1 interface. Signaling via the F1 interface is specified in the F1 Application Protocol (F1AP) in TS 38.473 of 3GPP Release 15, which is incorporated herein by reference in its entirety. As will be discussed below, a DU may be operative as part of various embodiments of the enhanced repeater as described throughout the present disclosure.

When referring to a TRP, while the term may be used interchangeably with the term gNB as noted above, the TRP may specifically reside with the DU of the gNB in many embodiments. That is, the TRP is one of the functionalities of the DU. TRPs may support communication functions such as a Transmission Point (TP) and a Reception Point (RP), as shown in FIG. 1b. Moreover, TRPs within a DU may include capabilities that are configured to perform specific functions such as (i) transmission of PRS in the downlink (e.g., DL-PRS) according to a selected configuration; (ii) receipt and measurement of other PRS or Sounding Reference Signals (SRS) in the uplink (e.g., UL-SRS) based on Angle of Arrival (AOA), as Relative Time of Arrival (RTOA), and/or signal transactions with another gNB; (iii) reporting of UL signal measurements (e.g., for a particular UE) to the LMF. In other words, a major role of a DU is to provide an interface and manage interactions between the edge of the NR network (i.e., closer to UEs and potentially providing a direct terminal for UEs the DU serves), and the rest of the NG-RAN and/or the backend (e.g., core network).

Furthermore, in certain embodiments useful for realizing the present disclosure, the TRP of a DU may be configured, e.g., by the LMF, to provide positioning functionalities only. That is, such a positioning-only DU may not offer cellular connectivity or services to a UE or a CU, although the positioning-only DU may support downlink transmission or uplink receipt of PRS-only positioning beacons (e.g., DL-PRS and UL-PRS).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LNIF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., BS 120 or AP 130) or some other location such as a location for UE 105 at some known previous time, or a location of another UE 145 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
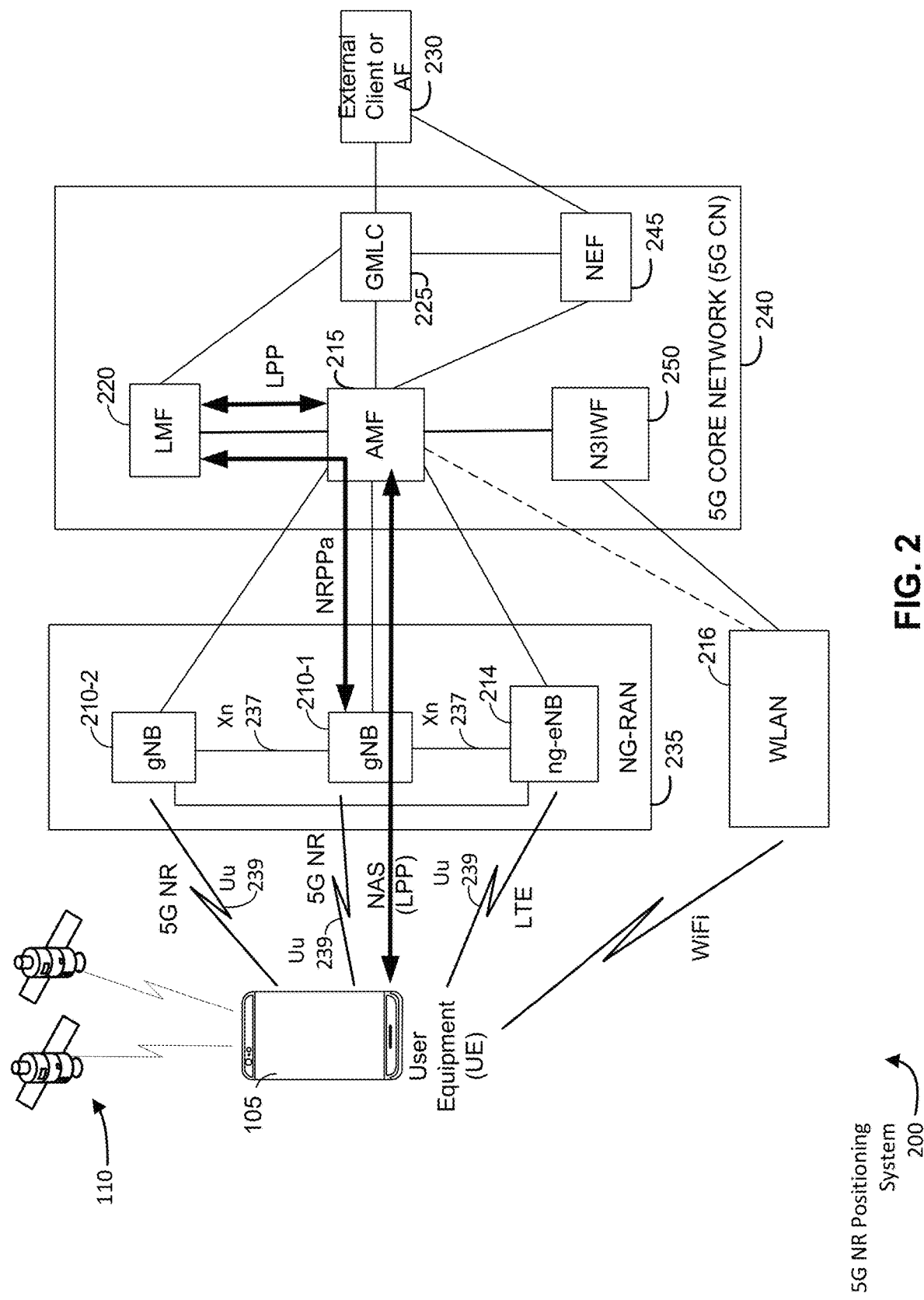
FIG. 2 illustrates a diagram of an exemplary embodiment of a positioning system (e.g., the positioning system of FIG. 1a) implemented within a Fifth Generation New Radio (5G NR) communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1*a*) and (optionally) an LMF 220 (which may correspond with location server 160) to implement one or more positioning methods. In some embodiments, access node 210 may include a gNB, which may be an example of the gNB illustrated in FIG. 1*b*. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMFs) 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or movable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1*a*) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1*a*, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1a and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235, e.g., directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2 and/or another gNB not shown) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1a). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
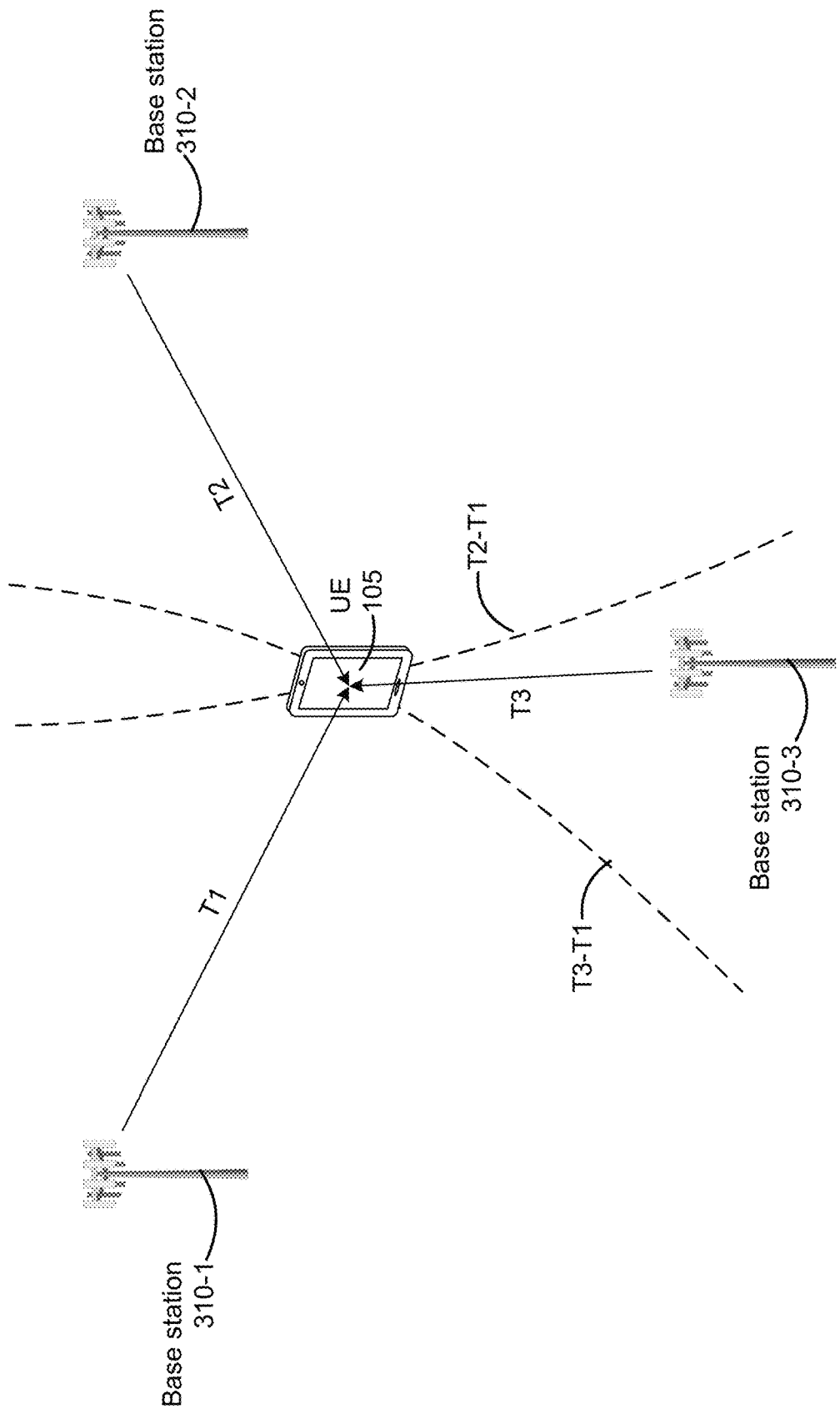
FIG. 3 illustrates a diagram of an exemplary embodiment of a positioning system (a portion of, e.g., the positioning system of FIG. 1a) in which Time Difference of Arrival (TDOA)-based positioning may be performed.

FIG. 3 is an illustration of how TDOA-based positioning can be performed, according to some embodiments. TDOA-based positioning uses wireless signaling between base stations 310-1, 310-2, and 310-3 (collectively and generically referred to herein as base stations 310) and the UE 105 to determine the location of the UE 105. Here, base stations 310 may correspond to base stations 120, gNBs 210, and/or ng-eNB 214 as previously described and illustrated in FIGS. 1 and 2. In brief, TDOA-based positioning uses known locations of the base stations 310 and time differences between signals sent to or received from the UE 105 to determine the location of the UE 105. In particular, downlink PRS (DL-PRS) uses time differences of signals sent from the base stations 310 to the UE 105, and uplink PRS (UL-PRS) uses time differences of signals sent from the UE 105 to the base stations 310.

In TDOA-based positioning, a location server may provide TDOA assistance data to a UE 105 for a reference base stations (which may be called a "reference cell" or "reference resource"), and one or more neighboring base stations (which may be called "neighbor cells" or "neighboring cells", and which individually may be called a "target cell" or "target resource") relative to the reference base station. For example, the assistance data may provide the center channel frequency of each base station, various PRS configuration parameters (e.g., PRS length, periodicity, muting sequence, frequency hopping sequence, PRS ID, PRS bandwidth), a base station (cell) global ID, PRS signal characteristics associated with a directional PRS, and/or other base station related parameters applicable to TDOA or some other position method. TDOA-based positioning by a UE 105 may be facilitated by indicating the serving base station for the UE 105 in the TDOA assistance data (e.g., with the reference base station indicated as being the serving base station). For DL-TDOA, TDOA assistance data may also include "expected Reference Signal Time Difference (RSTD)" parameters, which provide the UE 105 with information about the RSTD values the UE 105 is expected to measure at its current location between the reference base station and each neighbor base station, together with an uncertainty of the expected RSTD parameter. The expected RSTD, together with the associated uncertainty, may define a search window for the UE 105 within which the UE 105 is expected to measure the RSTD value. DL-TDOA assistance information may also include PRS configuration information parameters, which allow a UE 105 to determine when a PRS positioning occasion occurs on signals received from various neighbor base stations relative to PRS positioning occasions for the reference base station, and to determine the PRS sequence transmitted from various base stations in order to measure a time of arrival (TOA) or RSTD. TOA measurements may be RSRP (Reference Signal Receive Power) measurements of average power of Resource Elements (RE) that carry PRS (or other reference signals).

Using the RSTD measurements, the known absolute or relative transmission timing of each base station, and the known position(s) of wireless node physical transmitting antennas for the reference and neighboring base stations, the UE position may be calculated (e.g., by the UE 305 or by a location server). More particularly, the RSTD for a neighbor base station "k" relative to a reference base station "Ref," may be given as the difference in TOA measurements of signals from each base station (i.e., $TOA_k - TOA_{Ref}$), where the TOA values may be measured modulo one subframe duration (1 ms) to remove the effects of measuring different subframes at different times. In FIG. 3, for example, a first base station 310-1 may be designated as the reference base station, and second and third base stations (310-2 and 310-3) are neighbor base stations. If UE 105 receives reference signals from first base station 310-1, second base station 310-2, and third base station 310-3 at times T1, T2, and T3, respectively, then the RSTD measurement for second base station 310-2 would be determined as T2−T1 and the RSTD measurement for third base station 310-3 would be determined as T3−T1. RSTD measurements can be used by the UE 105 and/or sent to a location server to determine the location of the UE 105 using (i) the RSTD measurements, (ii) the known absolute or relative transmission timing of each base station, (iii) the known position(s) of base stations 310 for the reference and neighboring base stations, and/or (iv) directional PRS characteristics such as a direction of transmission. Geometrically, information (i)-(iv) allows for possible locations of the UE 105 to be determined for each RSTD (where each RSTD results in a hyperbola, as shown in FIG. 3), and the position of the UE 105 to be determined from the intersection of the possible locations for all RSTDs.

UL-TDOA positioning uses a similar process to the DL-TDOA described above. However, rather than making RSTD measurements at the UE 105, the UE 105 can transmit one or more reference signals, which are measured by base stations 310. Differences in times at which the base stations receive the signals (accounting for any time differences between the transmission of different signals) can be used to determine the location of the UE 105. Assistance data provided to the UE 105 for UL-TDOA may comprise PRS configuration parameters (similar to those described above with regard to DL-TDOA) for transmitting the one or more reference signals.

Figure 4:
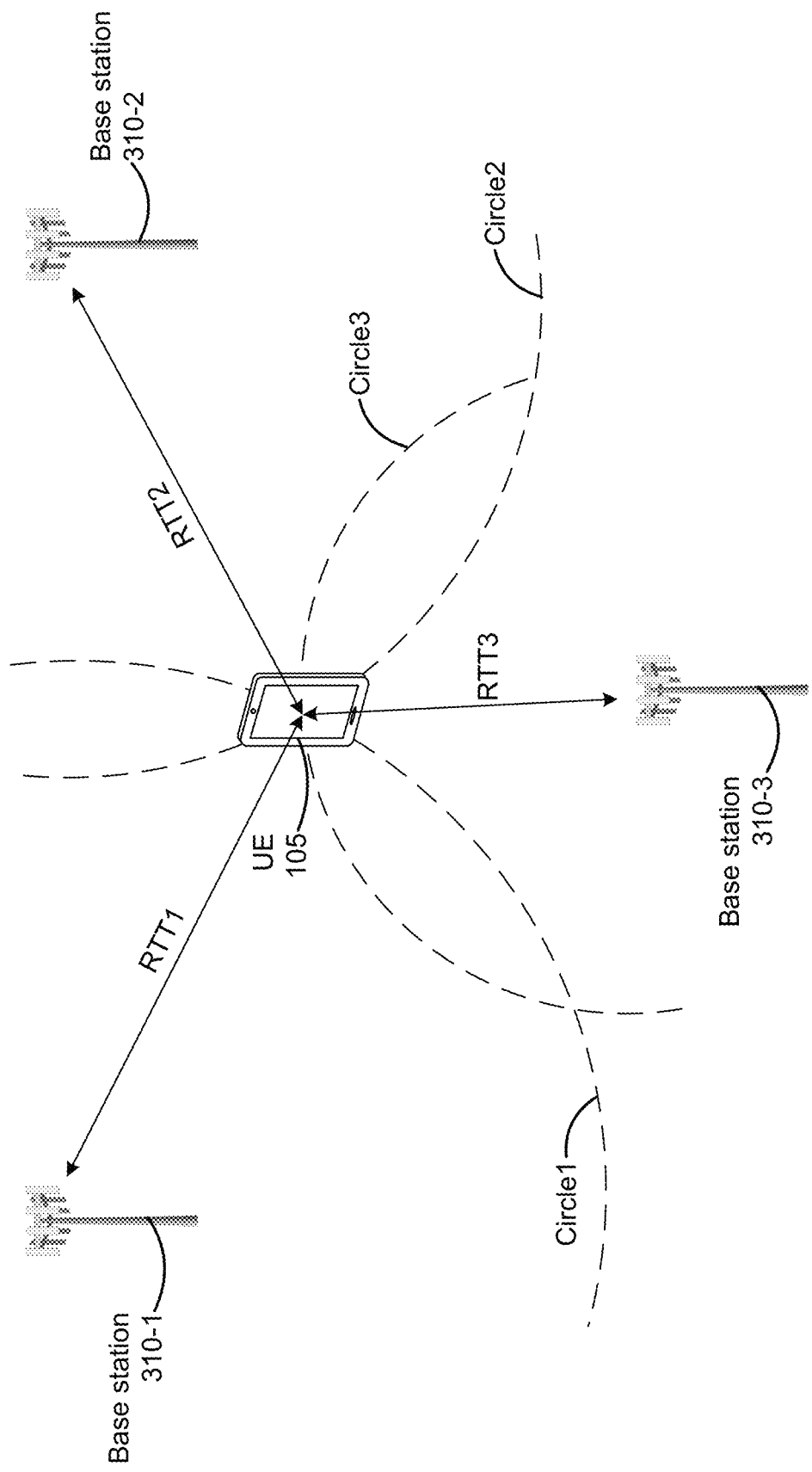
FIG. 4 illustrates a diagram of an exemplary embodiment of a positioning system (a portion of, e.g., the positioning system of FIG. 1a) in which Round Trip Time (RTT)-based positioning may be performed.

FIG. 4 is an illustration of how RTT-based positioning (or multi-RTT) can be performed, according to some embodiments. In brief, RTT-based positioning includes positioning methods in which the position of the UE 105 is determined based on known positions of base stations (e.g., base stations 310) and/or other devices with known locations (e.g., other UEs), and determined distances between the UE 105 and the base stations and/or other devices. RTT measurements between the UE 105 and each base station/device are used to determine a distance between the UE 105 and the respective base station, and multilateration can be used to determine the location of the UE 105. It can be noted that, in alternative embodiments, other devices with known locations (e.g., other UEs, other types of base stations, etc.) can be used in addition or as an alternative to the base stations 310 illustrated in FIG. 4.

In RTT-based positioning, a location server may coordinate RTT measurements between the UE 105 and each base station. Information provided to the UE 105 may be included in RTT assistance data. This can include, for example, reference signal (e.g., PRS) timing and other signal characteristics, base station (cell) ID, and/or other base station related parameters applicable to multi-RTT or some other position method. Depending on desired functionality, RTT measurements may be performed (and initiated by) the UE 105 or a base station 310.

RTT measurements measure distance using Over The Air (OTA) delay. An initiating device (e.g., the UE 105 or a base station 310) transmits a first reference signal at first time, T1, which propagates to a responding device. At a second time, T2, the first reference signal arrives at the responding device. The OTA delay (i.e., the propagation time it takes for the first reference signal to travel from the initiating device to the responding device) is the difference between T1 and T2. The responding device then transmits a second reference signal at a third time, T3, and the second reference signal is received and measured by the initiating device at a fourth time, T4. RSRP measurements may be used to determine TOA for times T2 and T4. Distance, d, between the initiating and responding devices therefore can be determined using the following equation:

$$\frac{2d}{c} = (T_4 - T_1) - (T_3 - T_2) = (T_4 - T_1) + (T_2 - T_3). \quad (1)$$

(As will be appreciated, distance, d, divided by the speed of RF propagation, c, equals the OTA delay.) Thus, a precise determination of the distance between the initiating device and responding device can be performed.

RTT measurements between the UE 105 and base stations 310 can therefore allow the position of the UE 105 to be determined using multilateration. That is, RTT measurements between the UE 105 and the first base station 310-1, second base station 310-2, and third base station 310-3 (RTT measurements RTT1, RTT2, and RTT3, respectively) result in a determination of the distance of the UE 105 from each of the base stations 310. These distances can be used to trace circles around known positions of the base stations P210 (where Circle1 corresponds to base station 310-1, Circle2 corresponds to base station 310-2, and Circle3 corresponds to base station 310-3.) The position of the UE 105 can be determined as the intersection between the circles.

Figure 5:
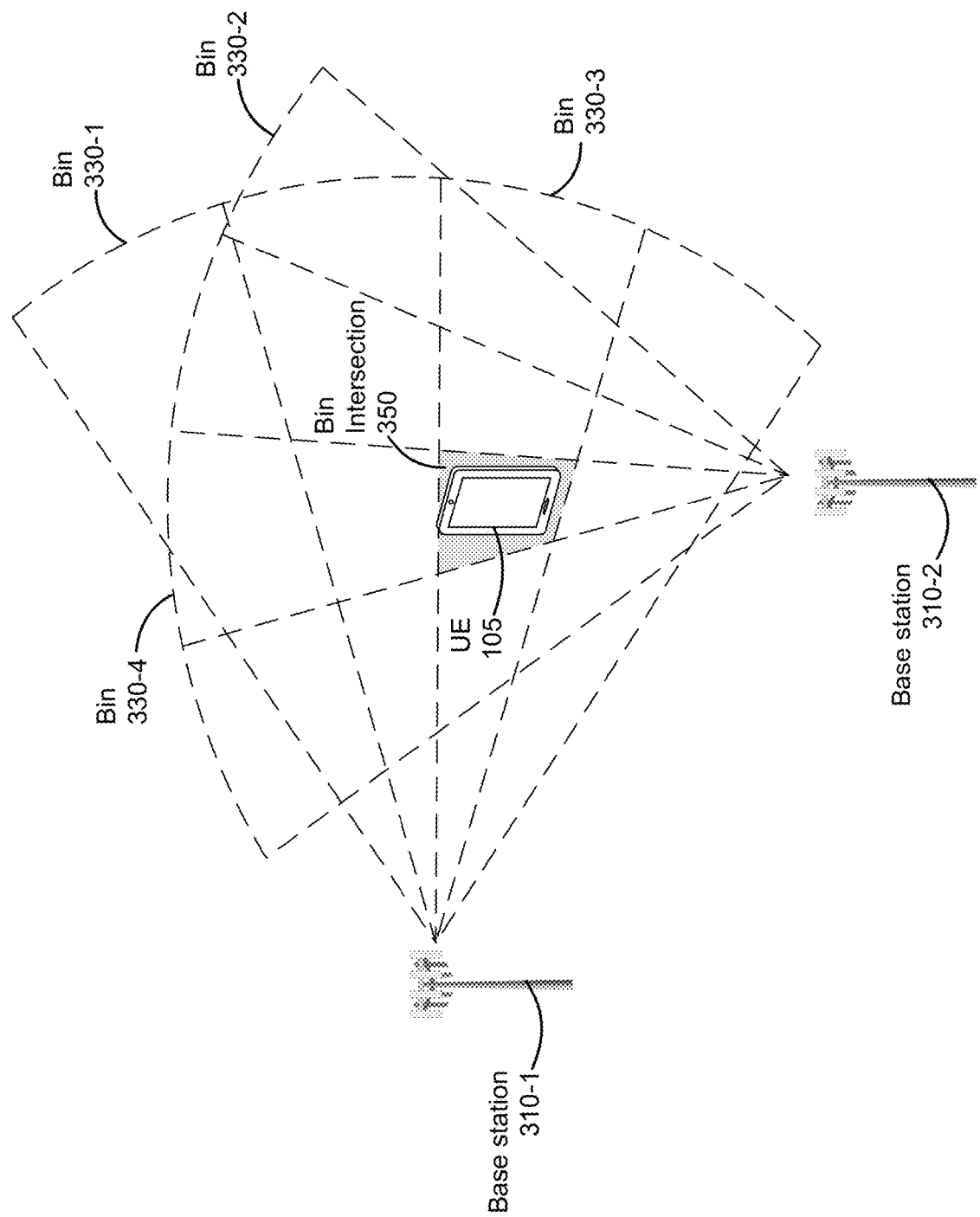
FIG. 5 illustrates a diagram of an exemplary embodiment of a positioning system (a portion of, e.g., the positioning system of FIG. 1a) in which Angle of Departure (AOD)-based positioning and/or Angle of Arrival (AOA)-based positioning may be performed.

FIG. 5 is an illustration of how AOD-based positioning (or DL-AOD) can be performed, according to some embodiments. In brief, AOD-based positioning is positioning based on reference signals (e.g., PRS, including DL-PRS) received by the UE 105, transmitted by certain beams, antennas, or air interfaces of the base stations 310, and a corresponding coverage area covered by the beams.

In AOD-based positioning, a location server (e.g., location server 160 shown in FIG. 1a) may provide AOD assistance data to a UE 105. This assistance data, which may be based on an approximate location of the UE 105, may provide information regarding reference signals for nearby base stations 310, including center channel frequency of each base station, various PRS configuration parameters (e.g., NPRS, TPRS, muting sequence, frequency hopping sequence, PRS ID, PRS bandwidth, beam ID), a base station (cell) global ID, PRS signal characteristics associated with a directional PRS, and/or other base station related parameters applicable to AOD or some other position method.

Using this information, the UE 105 and/or the location server can determine the UE's location by the beam(s) with which the UE 105 detects a PRS from each base station 310. More specifically, PRS from a base station 310 is transmitted via a beam centered along angular regions, or bins 330-1, 330-2, 330-3, 330-4, etc. (collectively or individually referred to as bin(s) 330). Thus, each bin 330 can correspond to a PRS from a different respective beam. Bins 330 from different base stations 310 can form an angular grid that can be used to determine the location of the UE 105. For example, as illustrated in FIG. 3, bins of base station 310-1 including bins 330-1 and 330-3 intersect with bins of base station P310-2 including bin 330-2 and 330-4 to form an angular grid. The UE 105 can measure (e.g., using RSRP measurements) the PRS of different beams of each base station 310. These measurements can be used by the UE 105 or sent to the location server to determine the location of the UE 105 from the corresponding bin intersection 350, where the bin P330-3 corresponding to the PRS of a first base station P310-1 intersects with the bin P330-4 corresponding to the PRS of a second base station P310-2. Similar measurements can be made from additional base stations (not shown) to provide additional accuracy. Additionally or alternatively, measurements from multiple beams of a single base station 310 can enable interpolation for higher-resolution positioning.

Furthermore, AOA-based positioning (or UL-AOA) can be performed using these base stations 310, according to some embodiments. In brief, AOA-based positioning is positioning based on reference signals (e.g., PRS, including UL-PRS) received from the UE 105, received by certain beams, antennas, or air interfaces of the base stations 310, and a corresponding coverage area covered by the beams.

Using this information, the UE 105 and/or the location server can determine the UE's location by the beam(s) with which the base stations 310 detects a PRS from the UE 105. A bin intersection 350 can be determined similar to the AOD-based positioning described above. Similar measurements can be made from additional base stations (not shown) to provide additional accuracy. Additionally or alternatively, measurements from multiple, more granular beams of a single base station 310 can enable interpolation for higher-resolution positioning.

Architecture of Positioning System Using an Enhanced Repeater

Figure 6:
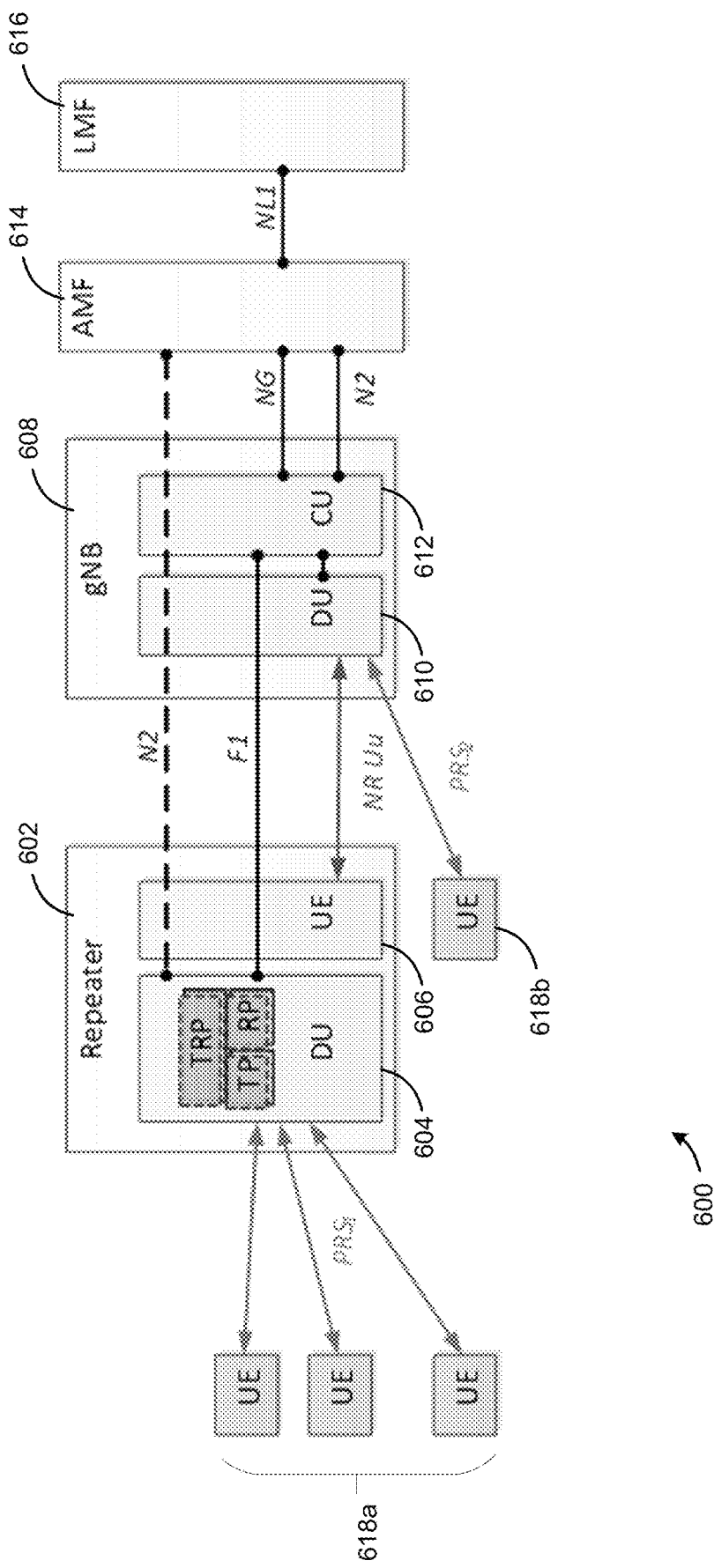
FIG. 6 is a block diagram that illustrates an architecture useful for transmission and receipt of positioning signals in a wireless network via a positioning-only enhanced repeater (or "smart repeater"), according to one embodiment.

FIG. 6 is a block diagram that illustrates an architecture 600 useful for transmission and receipt of positioning signals in a wireless network via an enhanced repeater (or "smart repeater") 602, according to one embodiment. The enhanced repeater may be referred to as a "serving gNB" elsewhere herein. In some embodiments, multiple enhanced repeaters 602 may be present in the architecture. In some embodiments, the enhanced repeater 602 advantageously includes at least two separate functionalities: a DU functionality 604 and a UE functionality 606. The DU functionality 604 may be an example of the DU shown in FIG. 1B. In some embodiments, the DU and UE functionalities 604, 606 may be physically separated portions residing within the enhanced repeater 602, e.g., a DU and a UE modem (as defined below) residing and operative in the enhanced repeater 602. In some embodiments, the DU and UE functionalities 604, 606 may be logically and functionally distinct functions being implemented by the enhanced repeater 602.

The architecture 600 further includes at least one gNB 608 neighboring the enhanced repeater in the exemplary embodiment. In some embodiments, a plurality of neighboring gNBs 608 may be present in the architecture. The gNB 608 may include at least one gNB-DU 610 and at least one gNB-CU 612 in data communication with each other via an F1 interface. The gNB-DU 610 and the gNB-CU 612 may be examples of the DU and CU as shown in FIG. 1B. The gNB 608 is configured for data communication with the enhanced repeater 602 via one of a plurality of ways; such options are described elsewhere below. Hence, the architecture includes multiple nodes for communicating configuration data for positioning signals, i.e., at least the gNB 608 and the enhanced repeater 602.

In some embodiments, multiple gNBs may be positioned in series or in parallel, and one or more of the gNBs may be configured for data communication with the enhanced repeater.

The architecture 600 further includes an Access and Mobility Management Function (AMF) 614 in the exemplary embodiment. The AMF may be configured to receive connection and session related information from a target UE (via an N1 interface (transparent interface between UE and AMF for transferring information related to connection, mobility and sessions), an N2 interface (control-plane signaling) and/or an N3 interface (user-plane signaling)), and is responsible for handling connection and mobility management tasks. AMF 614 may be an example of the AMF 215 shown in FIG. 2.

The architecture 600 further includes a Location Management Function (LMF) 616 in the exemplary embodiment. The LMF 616 may be an example of the LMF 220 shown in FIG. 2. The LMF may be configured to receive measurement data and assistance information via the NG-RAN and via the AMF 614, and ultimately from one or more target UE(s) 618*a* and/or 618*b*. Such information may be received via the various interfaces NL1 interface. The information may then be used to compute the position of the target UE(s). In the exemplary embodiment, the LMF is configured for data communication with the AMF 614, which in turn is configured for data communication with the gNB 608, and thereby the enhanced repeater 602 and the target UE(s) 618*a* it serves.

As an aside, given the nature of the positioning described herein, many embodiments described herein use UE-assisted positioning. That is, the target UE(s) 618*a* and/or the enhanced repeater 602 provide position measurements to a location server (e.g., 160) for computation of a location estimate by the location server. In some embodiments, the location server may embody the LMF 616.

Signaling between gNB-CU 612 and AMF 614 may be performed via N2 (an NG control plane interface (NG-C)) and is specified in NRPPa, according to one embodiment. Signaling between gNB-CU 612 and gNB-DU 610 (including its TRP) may be performed via F1. Several alternate options are available for signaling to the enhanced repeater 602: (1) In some embodiments, an N2 interface may be defined between the AMF 614 and the enhanced repeater 602. (2) In some embodiments, an F1 interface may be defined between the gNB-CU 612 and the enhanced repeater 602. (3) In some embodiments, NRPPa messages between the LMF 616 and the enhanced repeater 602 may be transported over Radio Resource Control (RRC) and NAS between gNB 608 and enhanced repeater 602, and AMF 614 and enhanced repeater 602, respectively. (4) In some embodiments, a user-plane function may be used between the LMF 616 and the UE functionality 606 of the enhanced repeater 602.

Embodiments associated with options (1)-(3) may allow the LMF 616 to see all positioning TRPs in the same way, whether it is associated with a gNB (e.g., 608), a positioning beacon (TBS), or a repeater (e.g., 602). Embodiments associated with option (4) may use some architectural modification and result in the enhanced repeater 602 being seen as a UE from the point of view of the LMF 616, which may be suboptimal for NRPPa messages, which may be of relatively large size.

While noting that the other options discussed above are viable embodiments, a new F1 interface may be implemented between the gNB-CU 612 and the DU 604 of the enhanced repeater 602 (per option 2) in one embodiment, as shown in FIG. 6. The enhanced repeater 602 may thereby extend the communication range of the NG-RAN by virtue of the DU functionality 604 (e.g., by data communication with upstream gNB-CU(s) of other gNBs and with LMF, and with downstream UE(s)), as well as generate its own positioning signals rather than relaying positioning signals, e.g., DL-PRS, by virtue of its UE functionality 606. Simply relaying positioning signals from other gNBs (or its TRPs), as a typical repeater would do, may incur delays in transmission of signals and cause positioning errors for the UE.

Herein lies one salient advantage of the present disclosure. The separation of the DU and UE functionalities in this architecture 600 allows the enhanced repeater 602 to support positioning by transmitting its own DL-PRS and perform measurements on received UL-SRS signals from the UE (as opposed to relaying the received signals). The measurement reports may then be transmitted the to the LMF 616 via the gNB. The LMF 616 may then use the measurement reports to estimate UE location, the foregoing being described in greater detail below.

Figure 7:
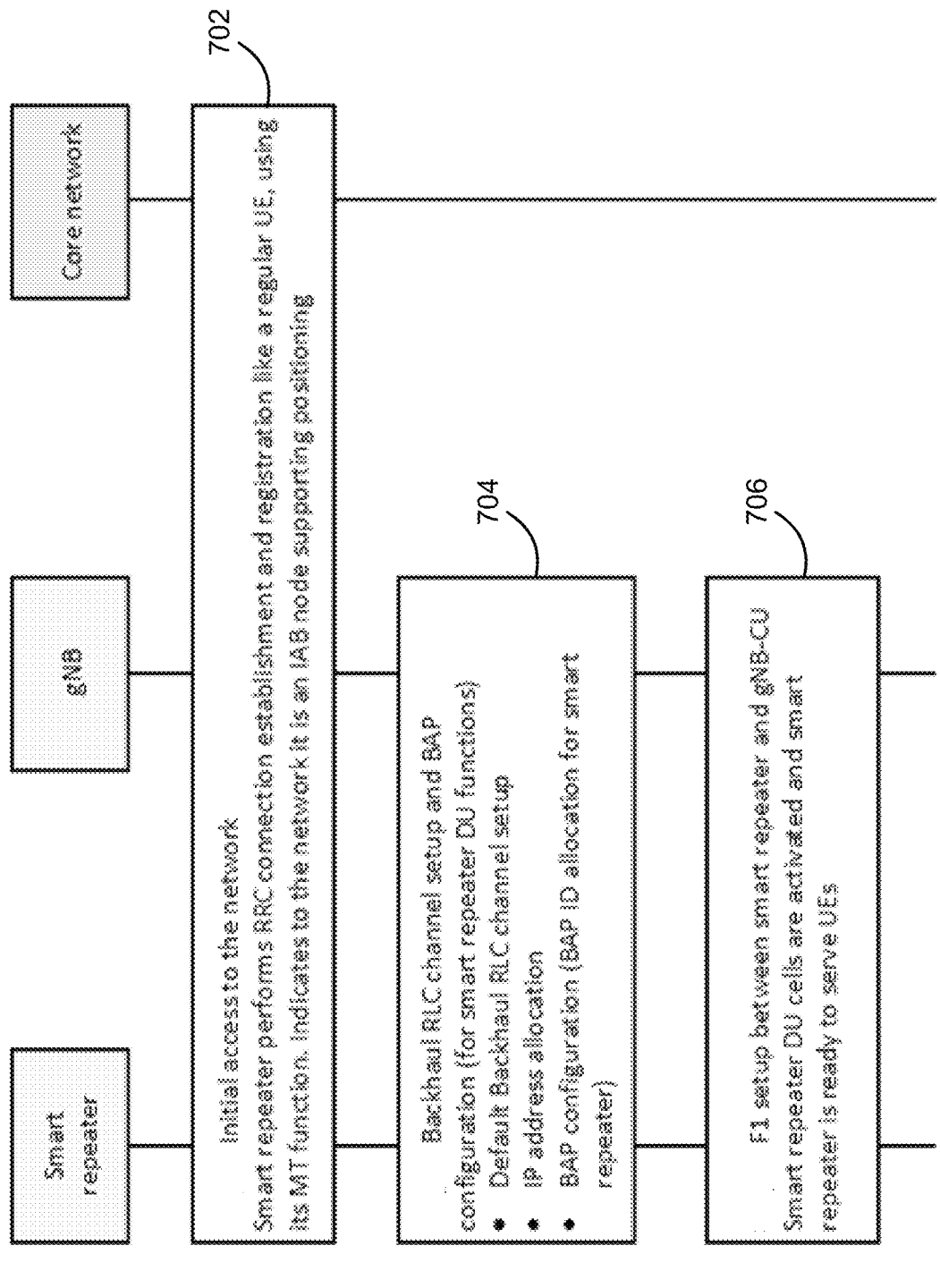
FIG. 7 illustrates a call-flow diagram for a setup and/or registration process of an enhanced repeater to be used with the architecture of FIG. 6, according to one embodiment.

FIG. 7 illustrates a call-flow diagram for a setup and/or registration process 700 of an enhanced repeater (e.g., 602) to be used with a network architecture (e.g., 600), according to one embodiment. In order for the enhanced repeater 602 to operate with the DU and UE functionalities (described above) within the architecture 600, the enhanced repeater 602 must register with the core network so as to be recognized as a network node. A parallel may be drawn between the described setup process and the process for integrated access and backhaul (IAB) nodes. IAB in 5G networks allows multi-hop backhauling using the same frequencies employed for UE access, or a dedicated frequency. An IAB donor is a logical node that provides wireless backhaul and consists of a CU and wire-connected donor DU(s), e.g., CU 612 and DU 610. IAB donors terminate the backhaul traffic from distributed IAB nodes; i.e., IAB donors are in direct communication with the core network. In many embodiments, IAB nodes do not include CU functionality but does include Mobile Termination (MT) functionality. Here, the notion that a non-serving gNB (e.g., gNB 608) functions similarly to an IAB donor node, and that the serving enhanced repeater (e.g., 602) functions similarly to an IAB node (non-donor), will be used during the setup process.

Turning to step 702 of the setup procedure, the enhanced repeater (e.g., 602) may seek initial access to the network and enable UE functionality for the enhanced repeater. In some embodiments, the enhanced repeater may establish an RRC-based connection and registration with the core network (e.g., with the LMF (e.g., 616)) using the MT function of the enhanced repeater, via at least one gNB (e.g., 608), similar to what a UE (e.g., 105) may do. The enhanced repeater may indicate to the core network that the enhanced repeater is an IAB node and/or that it has IAB node capability. In some embodiments, the enhanced repeater also may indicate to the core network that it is a positioning-only node that only supports positioning (e.g., generates PRS, measures SRS), and may transmit to the core network other data relating to capability and location of the enhanced repeater. In some embodiments, the enhanced repeater may indicate to the core network that is supports positioning (but not necessarily only positioning). One or more of these indications to the core network causes the LMF to be aware that the enhanced repeater is configured to function as a repeater/or and a UE.

At step 704 of the setup procedure, the enhanced repeater may perform setup for one or more backhaul Radio Link Control (RLC) channels, and perform configuration for backhaul adaptation protocol (BAP), which enables DU functionality for the enhanced repeater. The RLC protocol for 5G NR is specified in TS 38.322 of 3GPP Release 15, incorporated herein by reference in its entirety. BAP enables efficient IP data forwarding across the IAB-interconnected nodes, where the BAP data is carried by backhaul RLC channels on each backhaul link. The foregoing RLC and BAP configuration also allocates an IP address and a BAP ID for the enhanced repeater.

At step 706 of the setup procedure, the enhanced repeater performs setup for an interface between the enhanced repeater and a network node. More specifically, the F1 interface may be initialized between the gNB-CU (e.g., 612) and the DU functionality (e.g., 604) of the enhanced repeater. Following setup for the F1 interface, the DU functionality of the enhanced repeater may be activated, and the enhanced repeater may thereby be ready to serve UEs (e.g., 618a).

Figure 8:
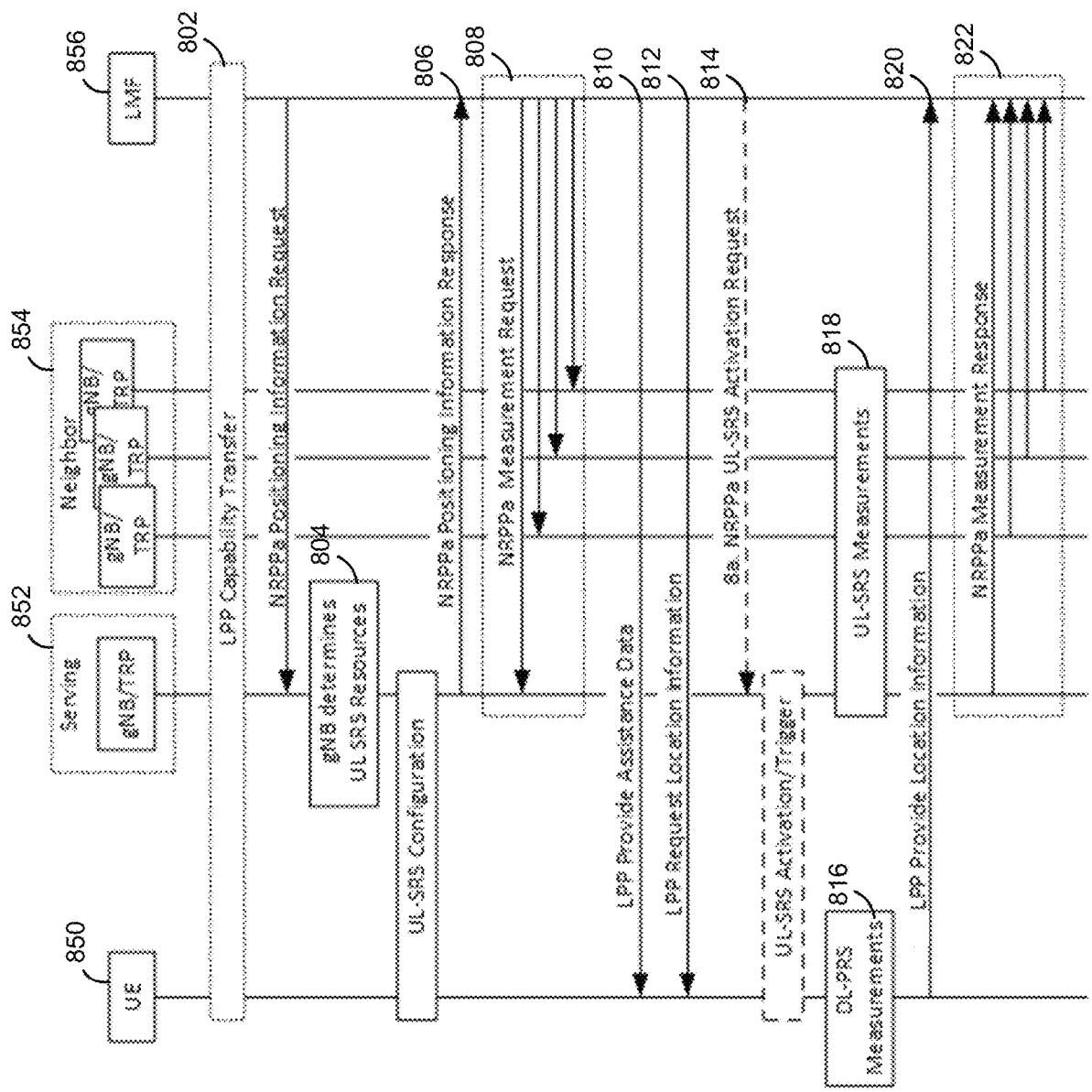
FIG. 8 illustrates a diagram of a call flow for a positioning procedure using the architecture of FIG. 6 and subsequent to the setup procedure of FIG. 7, according to one embodiment.

FIG. 8 illustrates a diagram of a call flow 800 for a positioning procedure using the architecture 600 and subsequent to the setup procedure 700, according to one embodiment. Signals may be exchanged among a target UE 850, a serving gNB 852, one or more other gNBs (including those neighboring the serving gNB) 854, and an LMF 856. The LMF 856 may be an example of the LMF 616 as shown in FIG. 6 (or LMF 220 as shown in FIG. 2). In some embodiments, each of the one or more gNBs 854 may be an example of gNB 608 as shown in FIG. 6 (or gNBs 210 of an NG-RAN as shown in FIG. 2). The serving gNB 852 may be an example of gNB 608 as shown in FIG. 6. In some embodiments, at least some of the one or more gNBs 854 and/or other gNBs not shown in FIG. 8 may be a serving gNB capable of performing the same steps performed by serving gNB 852 as discussed below with the LMF 856 and a UE (either the target UE 850 or its own UE). The multiple gNBs in the configuration of FIG. 8 may also be configured for multi-RTT measurements as described with respect to FIG. 4.

At step 802 of the call flow 800, the LMF may request positioning capabilities from the target UE. More specifically, the LMF may request configuration information for the target UE from the serving gNB. In some embodiments, the LMF may send an NRPPa Positioning Information Request message to the serving gNB, and the requested configuration information may be UL-SRS confirmation information. The LMF may also provide any assistance data usable by the serving gNB and/or its neighboring gNBs (e.g., pathloss reference, spatial relation, Synchronization Signal Block (SSB) configuration).

At step 804, the serving gNB may determine resources available for the UL-SRS and configure the target UE with one or more UL-SRS resource sets based on the determination of the resources available. At step 806, the serving gNB may provide the configuration information (e.g., UL-SRS) derived from step 804 to the LMF. In some embodiments, these resources may include time and/or frequency resources (e.g., resource blocks, resource elements, etc. of an orthogonal frequency-division multiplexing (OFDM) or other communication scheme) that may be used to transmit the UL-SRS to the serving gNB. Once the serving gNB determines which resources the target UE could use for transmitting the UL-SRS, the serving gNB may configure the target UE for communication, e.g., by including the information in configuration signals or data for the target UE, such that the target UE will be aware when and how to transmit the UL-SRS to the serving gNB.

At step 808, the LMF may select one or more candidate gNBs (or more specifically, TRPs) and provide the configuration information (e.g., UL-SRS configuration) to the TRPs. In some embodiments, the serving gNB (and its TRP) is included with the candidate gNBs, with at least one neighboring gNB in data communication with the serving gNB required to reach the LMF. In some embodiments, the LMF may send an NRPPa Measurement Request message to each of the selected TRPs to provide the configuration information. The messages with the configuration information may include information required to enable the TRPs to perform uplink measurements with respect to the target UE.

At step 810, the LMF may send an LPP Provide Assistance Data message to the target UE. The message may include any required assistance data for the UE to perform necessary downlink measurements relative to the gNBs (TRPs) in the network. In some embodiments, the downlink measurements required by the LPP Provide Assistance Data message may include downlink measurements from at least the TRPs selected at step 808.

At step 812, the LMF may send an LPP Request Location Information message to request downlink measurements by the UE. In some embodiments, the TRPs included in the downlink measurements may include at least the TRPs selected at step 808.

Optionally, at step 814, in implementation in which semi-persistent or aperiodic UL-SRS is used (as opposed to periodic), the LMF may request the serving gNB to activate the UL-SRS at the UE. The gNB may then activate or trigger the UL-SRS from the UE in response to the request, causing transmission of UL-SRS and/or performance of uplink measurements (see step 818). If such semi-persistent or aperiodic UL-SRS is not used, this step may be omitted.

Otherwise, at step 816, the UE may perform downlink measurements from TRPs provided in the assistance data provided at step 810. In some embodiments, the downlink measurements may be performed relative to the serving gNB. DL-PRS from the serving gNB and/or other neighboring gNBs may be used as additional RTT measurements, e.g., for multi-RTT positioning.

At step 818, each configured TRP (i.e., those provided in the assistance data provided at step 810) may perform uplink measurements based on received UL-SRS from the target UE at each configured TRP.

At step 820, the target UE may report the downlink measurements to the LMF. More specifically, in some embodiments, the target UE may send an LPP Provide Location Information message to the LMF, wherein this message contains the downlink measurements (i.e., those obtained by the UE at step 816).

At step 822, each TRP may report uplink measurements to the LMF (i.e., those measurements obtained by TRPs at step 818). In some embodiments, the TRPs reporting uplink measurements may include those TRPs provided in the assistance data provided at step 810.

Subsequently, the LMF may determine one or more parameters, including round-trip times (RTTs) from the target UE, and Receive Time-Transmission Time Difference (Rx-Tx) measurements for each TRP (including that of the serving gNB) for which corresponding uplink and downlink measurements were provided at steps 820 and 822. Based on the one or more parameters, the LMF may calculate the position of the target UE.

It is noted that at least some of the steps described above for call flow 800 may be performed in different orders in different embodiments (e.g., step 810 may be performed before or after step 812). At least some steps may be performed concurrently in some embodiments (e.g., steps 810 and 812 may be performed concurrently, or one message may contain both assistance data as well as a request for downlink measurements). It is also noted that in some embodiments, not every step may required. As but one example, once the LPP Provide Assistance Data message has been transmitted to the target UE, it may not be required for subsequent positioning for that same UE. That is, once steps 802 through 810 have been performed for a given UE, those steps may not need to be repeated for step 820 to take place, at least within a prescribed period of time.

Figure 9:
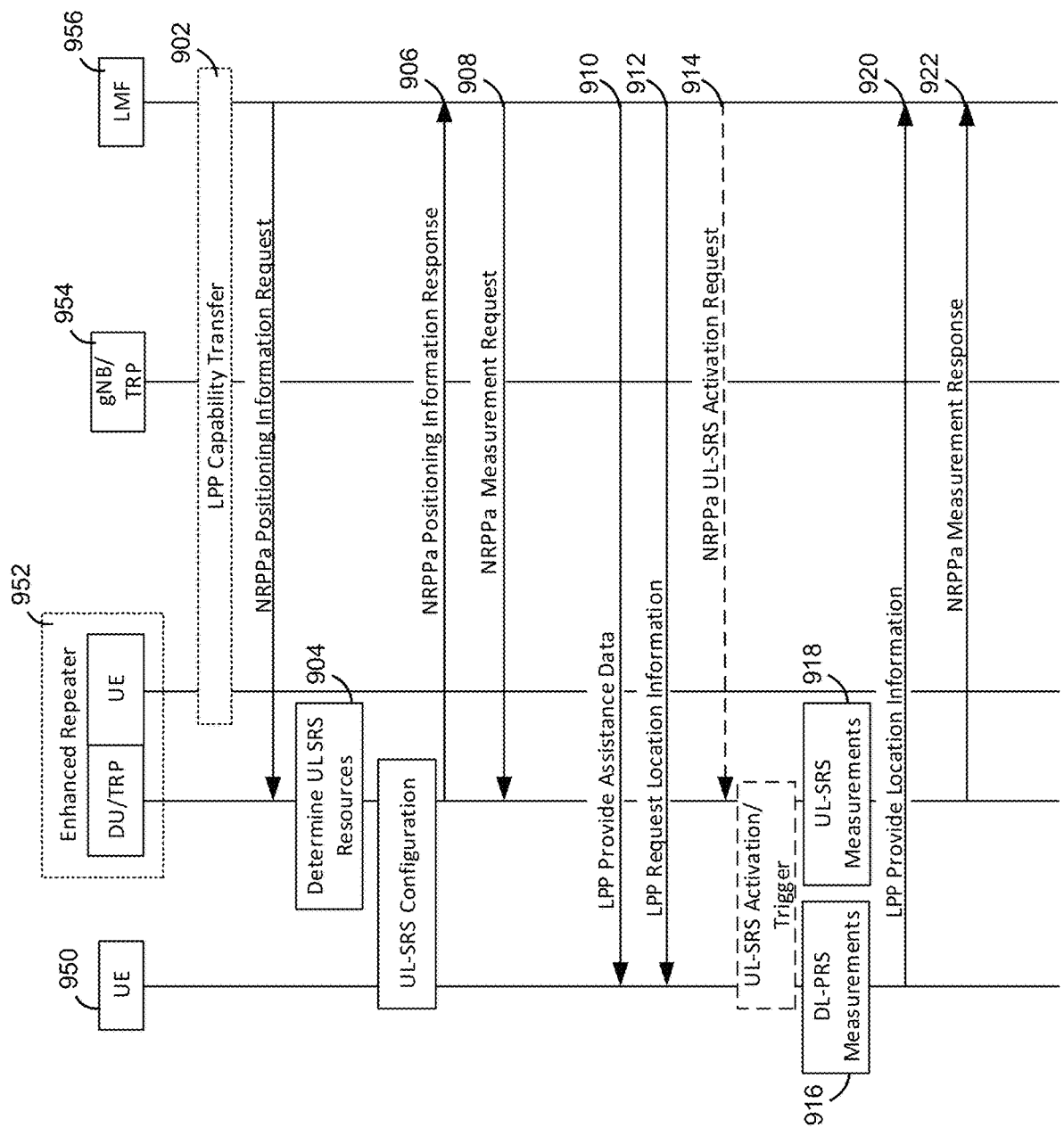
FIG. 9 illustrates a diagram of a call flow for a positioning procedure using an enhanced repeater disposed in the architecture of FIG. 6 and subsequent to the setup procedure of FIG. 7, according to one embodiment.

FIG. 9 illustrates a diagram of a call flow 900 for a positioning procedure using an enhanced repeater (e.g., 602) disposed in the architecture 600 and subsequent to the setup procedure 700, according to one embodiment. FIG. 9 shows a flow of signals exchanged among a target UE 950, an enhanced repeater 952, at least one gNB (including a serving gNB) 954, and an LMF 956. These entities may be examples of those discussed with respect to FIGS. 6 and 8. Specifically, the enhanced repeater 952 may be an example of enhanced repeater 602, the at least one gNB may be an example of gNB 608, and LMF 956 may be an example of LMF 616. The target UE 950 may be an example of one of the UE(s) 618a as shown in FIG. 6 (or UE 105 as shown in FIGS. 1a and 2). Moreover, the call flow depicted in FIG. 9 may be performed in a multi-RTT process similar to FIG. 8 (i.e., where each of the one or more gNBs 854 may be associated with a repeater or be a serving gNB to a UE). As described with respect to FIG. 6, each of these entities may be configured for data communication such that the LMF may transmit information (e.g., data, signals) to the target UE 950 and vice versa. That is, data communications between LMF 956 and enhanced repeater 952 may pass through and be relayed through the gNB 954.

In addition, in certain embodiments, the call flow illustrated in FIG. 9 may be performed in conjunction with the call flow illustrated in FIG. 8 to perform multi-RTT measurements (e.g., as described with respect to FIG. 4), where at least some gNBs, whether a serving gNB and/or other gNB(s), may communicate with the UE via the enhanced repeater 952 (or any repeater).

In the configuration shown in FIG. 9, the enhanced repeater may include a DU functionality and a UE functionality. The DU functionality may be an example of the DU functionality 604 described with respect to FIG. 6. The UE functionality may be an example of the UE functionality 606 described with respect to FIG. 6.

At least some of steps 902-922 may be similar to corresponding steps 802-822 discussed above; however, steps performed by the gNB in steps 802-822 may instead be performed specifically by the UE functionality or the DU functionality (including the TRP) of the enhanced repeater as discussed below.

At step 902, the LMF may request positioning capabilities from the UE functionality of the enhanced repeater. More specifically, the LMF may request configuration information for the UE functionality. In some embodiments, the LMF may send an NRPPa Positioning Information Request message to the UE functionality of the enhanced repeater, and the requested configuration information may be UL-SRS confirmation information. The LMF may also provide any assistance data usable by the enhanced repeater and/or its neighboring gNBs (e.g., pathloss reference, spatial relation, Synchronization Signal Block (SSB) configuration).

Moreover, in some embodiments, step 902 may temporally follow the steps described with respect to FIG. 7. That is, the LMF may request positioning capabilities from the UE functionality of the enhanced repeater after the setup procedure described in steps 702-706. Hence, in some embodiments, subsequent to the setup procedure, the DU functionality may provide an indication to the LMF that the enhanced repeater is ready to receive the request for positioning capabilities.

At step 904, the DU functionality of the enhanced repeater may determine the resources available for the UL-SRS and configure the target UE with one or more UL-SRS resource sets based on the determination of the resources available. At step 906, the DU functionality may provide the configuration information (e.g., UL-SRS) derived from step 904 to the LMF. In some embodiments, these resources may include time and/or frequency resources (e.g., resource blocks, resource elements, etc. of an OFDM or other communication scheme) that may be used to transmit the UL-SRS to the enhanced repeater. Once the enhanced repeater (e.g., at its DU) determines which resources the target UE could use for transmitting the UL-SRS, the DU functionality may configure the target UE for communication, e.g., by including the information in configuration signals or data for the target UE, such that the target UE will be aware when and how to transmit the UL-SRS to the enhanced repeater.

At step 908, the LMF may identify and select the enhanced repeater and provide the configuration information (e.g., UL-SRS configuration) to the TRP. More specifically, the TRP of the enhanced repeater may be selected, but not the TRPs of neighboring gNB (e.g., a serving gNB) in data communication with the enhanced repeater required to reach the LMF. In some embodiments, the LMF may send an NRPPa Measurement Request message to the TRP of the enhanced repeater to provide the configuration information. The message(s) with the configuration information includes information required to enable the TRP of the enhanced repeater to perform uplink measurements with respect to the target UE.

At step 910, the LMF may send an LPP Provide Assistance Data message to the target UE. The message may include any required assistance data for the target UE to perform necessary downlink measurements relative to the enhanced repeater (and its TRP). In some embodiments, the downlink measurements required by the LPP Provide Assistance Data message may include downlink measurements from at least the TRPs selected at step 908.

At step 912, the LMF may send an LPP Request Location Information message to request downlink measurements by the target UE. In some embodiments, the TRP included in the downlink measurements may include the TRP of the enhanced repeater, according to step 908.

Optionally, at step 914, in implementation in which semi-persistent or aperiodic UL-SRS is used (as opposed to periodic), the LMF may request the enhanced repeater to activate the UL-SRS at the target UE. The enhanced repeater may then activate or trigger the UL-SRS from the target UE in response to the request, causing transmission of UL-SRS and/or performance of uplink measurements (see step 918). If such semi-persistent or aperiodic UL-SRS is not used, this step may be omitted.

Otherwise, at step 916, the target UE may perform downlink measurements from the TRP provided in the assistance data provided at step 910. In some embodiments, the TRP corresponds to the TRP of the enhanced repeater. DL-PRS may be generated by the DU functionality (e.g., TRP) of the enhanced repeater. In certain embodiments configured for multi-RTT via a repeater, DL-PRS from other neighboring gNBs may be used as additional RTT measurements, e.g., for multi-RTT positioning.

At step 918, the TRP configured according to the assistance data (provided at step 910) may perform uplink measurements based on received UL-SRS from the target UE. In some embodiments, only the TRP of the DU functionality of the enhanced repeater may perform the uplink measurements.

At step 920, the target UE may report the downlink measurements to the LMF. More specifically, in some embodiments, the target UE may send an LPP Provide Location Information message to the LMF, wherein this message contains the downlink measurements (i.e., those obtained by the UE at step 916).

At step 922, the TRP may report uplink measurements to the LMF (i.e., those measurements obtained at step 918). In some embodiments, the uplink measurements may include those taken by the TRP of the enhanced repeater, enabled by the assistance data provided at step 910.

Subsequently, the LMF may determine one or more parameters, including round-trip times (RTTs) from the target UE, and Rx-Tx measurements for TRP (i.e., that of the enhanced repeater in some embodiments) for which corresponding uplink and downlink measurements were provided at steps 920 and 922. Based on the one or more parameters, the LMF may calculate the position of the target UE.

Such calculated position will have fewer (if any) errors relating to delays caused by multiple nodes (e.g., gNBs) in the network because the positioning signals are measured relative to the target UE and the enhanced repeater, rather than relayed from and to other base stations (e.g., a serving gNB and/or neighboring gNBs).

It is noted that at least some of the steps described above for call flow 900 may be performed in different orders in different embodiments (e.g., step 910 may be performed before or after step 912). At least some steps may be performed concurrently in some embodiments (e.g., steps 910 and 912 may be performed concurrently, or one message may contain both assistance data as well as a request for downlink measurements). It is also noted that in some embodiments, not every step may required. As but one example, once the LPP Provide Assistance Data message has been transmitted to the target UE, it may not be required for subsequent positioning for that same UE. That is, once steps 902 through 910 have been performed for a given UE, those steps may not need to be repeated for step 920 to take place at least within a prescribed period of time.

While in many embodiments discussed herein the enhanced repeater is configured to generate its own downlink positioning signals (e.g., DL-PRS) and perform measurements on received uplink positioning signals (e.g., UL-SRS), rather than relaying such positioning signals from and to other base stations, the enhanced repeater may continue to relay other types of signals on channels such as Physical Downlink Control Channel (PDCCH) which carries downlink control information, Physical Downlink Shared Channel (PDSCH) which carries downlink user data, Physical Uplink Control Channel (PUCCH) which carries uplink control information, and Physical Uplink Shared Channel (PUSCH) which carries uplink user data.

It will be appreciated and re-emphasized that, in many embodiments, the enhanced repeater described herein may include a discrete UE functionality, which is at least logically (and physically in some embodiments) separate from a discrete DU functionality of the enhanced repeater. The UE functionality may enable the LMF to, among other things, recognize the enhanced repeater as a positioning node, and receive a request for positioning capabilities from the LMF. The DU functionality (e.g., TRP) may enable generation of DL-PRS at the enhanced repeater so as to obviate relaying of DL-PRS generated elsewhere in the network. The DU functionality may further simultaneously enable data communication between the enhanced repeater and, e.g., upstream gNB-CU(s) and LMF, and is separate from the UE functionality. Other nodes in the architecture described herein, such as a serving gNB and non-serving neighboring gNBs, may not include such a discrete UE functionality, although there may be other enhanced repeaters in the NG-RAN architecture which do include UE and DU functionalities that are separate.

Methods

Figure 10:
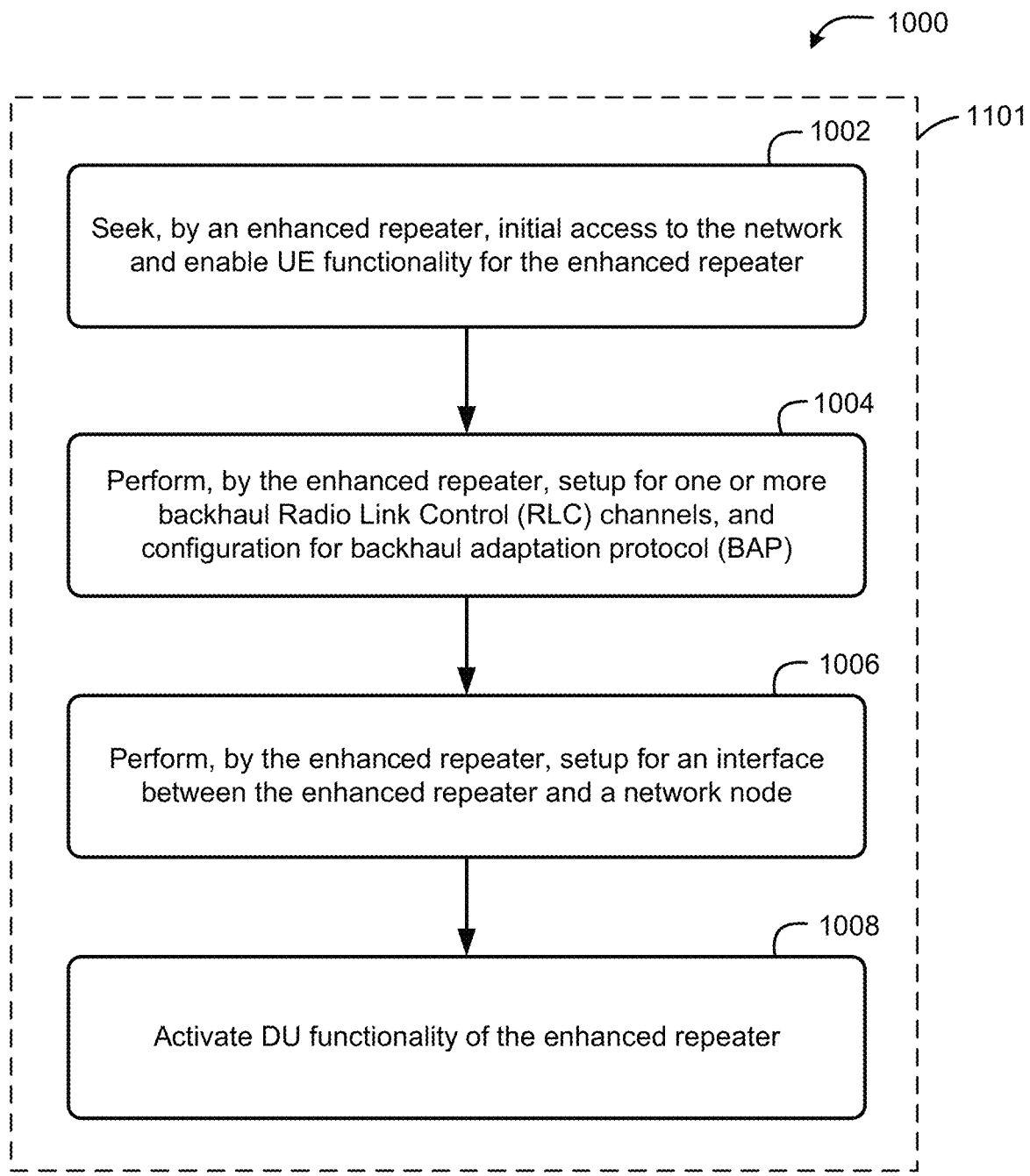
FIG. 10 illustrates a flow diagram of a method for performing setup and/or registration of an enhanced repeater of a wireless network.

FIG. 10 is a flow diagram of a method 1000 for performing setup and/or registration of an enhanced repeater of a wireless network. A computer-readable apparatus including a storage medium may store computer-readable and computer-executable instructions that are configured to, when executed by at least one processor apparatus, cause the at least one processor apparatus or another apparatus (e.g., the enhanced repeater) to perform the operations of the method 1000. It should be noted that the operations of the method 1000 may be performed in any suitable order, not necessarily the order depicted in FIG. 10. Further, the method 1000 may include additional or fewer operations than those depicted in FIG. 10 to accomplish the setup and/or registration. The operations of method 1000 may be performed by a computerized device or system (e.g., the enhanced repeater 602 of FIG. 6 or the enhanced repeater of FIG. 9). More directly, means for performing the functionality illustrated in one or more of the steps FIG. 10 may be performed by hardware and/or software components of the above-mentioned computerized device or system. Such components are described elsewhere below with respect to FIGS. 13-15.

The method 1000 may begin at step 1002, where an enhanced repeater (e.g., 602) may seek initial access to the network and enable UE functionality for the enhanced repeater. In some embodiments, the enhanced repeater may establish an RRC-based connection and registration with the core network (e.g., with the LMF (e.g., 616)) using the MT function of the enhanced repeater. This connection may be accomplished via at least one gNB (e.g., 608). In one embodiment, the connection may be accomplished via another enhanced repeater present in the NG-RAN. In some embodiments, the enhanced repeater may also indicate to the core network (e.g., LMF) that it is a positioning-only node that only supports positioning (e.g., generates PRS, measures SRS), and may transmit to the core network other data relating to capability and location of the enhanced repeater. In some embodiments, the enhanced repeater may indicate to the core network that it supports positioning and communication, not necessarily only positioning. One or more of these indications to the core network may cause the LMF to be aware that the enhanced repeater is configured to function as a repeater and/or as a UE.

At step 1004, the enhanced repeater may perform setup for one or more backhaul Radio Link Control (RLC) channels, and perform configuration for backhaul adaptation protocol (BAP), which enables DU functionality for the enhanced repeater. BAP enables efficient IP data forwarding across the interconnected nodes, where the BAP data is carried by backhaul RLC channels on each backhaul link. The foregoing RLC and BAP configuration also allocates an IP address and a BAP ID for the enhanced repeater.

At step 1006, the enhanced repeater may perform setup for an interface between the enhanced repeater and a network node. More specifically, the F1 interface may be initialized between the gNB-CU (e.g., 612) and the DU functionality (e.g., 604) of the enhanced repeater.

At step 1008, the DU functionality of the enhanced repeater may be activated, and the enhanced repeater may thereby be ready to serve UEs (e.g., 618a).

In some embodiments, the enhanced repeater may proceed to the below methodology 1100 to support positioning of the UE following the above methodology 1000.

Figure 11:
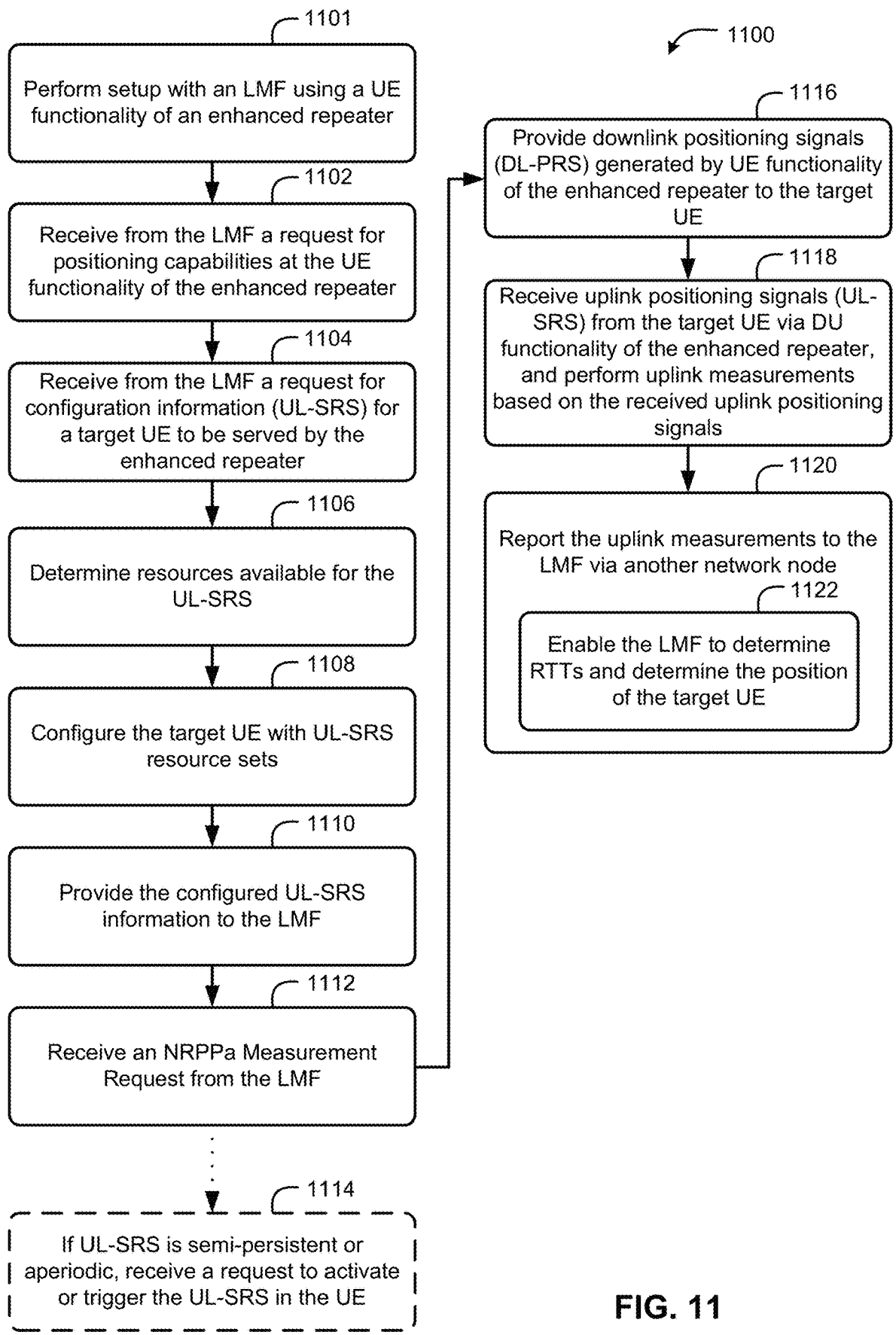
FIG. 11 illustrates a flow diagram of a method for positioning of a user equipment (UE) using an enhanced repeater, according to one embodiment.

FIG. 11 is a flow diagram of a method 1100 for positioning of a user equipment (UE) using an enhanced repeater (e.g. 602), according to one embodiment. A computer-readable apparatus including a storage medium may store computer-readable and computer-executable instructions that are configured to, when executed by at least one processor apparatus, cause the at least one processor apparatus or another apparatus (e.g., the enhanced repeater) to perform the operations of the method 1100. It should be noted that the operations of the method 1100 may be performed in any suitable order, not necessarily the order depicted in FIG. 11. Further, the method 1100 may include additional or fewer operations than those depicted in FIG. 11 to accomplish the UE positioning. The operations of method 1100 may be performed by a computerized device or system (e.g., the enhanced repeater 602 of FIG. 6 or the enhanced repeater of FIG. 9). More directly, means for performing the functionality illustrated in one or more of the steps FIG. 11 may be performed by hardware and/or software components of the above-mentioned computerized device or system. Such components are described elsewhere below with respect to FIGS. 13-15.

At step 1101 of method 1100, an enhanced repeater (i.e., with DU and UE separation) may perform setup with an LMF using the UE functionality of the enhanced repeater. In some embodiments, the setup performed with the LMF may include some or all of the steps 1002-1008 described above with respect to FIG. 10.

At step 1102 of method 1100, the enhanced repeater may receive a request from the LMF for positioning capabilities. The request may be received and/or processed at the UE functionality of the enhanced repeater. The enhanced repeater may be an example of the enhanced repeater 602 as described with respect to FIG. 6. The LMF may be an example of the LMF 616 as described with respect to FIG. 6.

At step 1104, the enhanced repeater may receive a request from the LMF for configuration information for a target UE to be served by the enhanced repeater, such as UL-SRS configuration information. In some embodiments, the request may be for configuration information for multiple target UEs. The enhanced repeater may also receive, from the LMF, assistance data needed by the enhanced repeater and/or its neighboring gNBs (e.g., pathloss reference, spatial relation, Synchronization Signal Block (SSB) configuration).

At step 1106, the enhanced repeater may determine the resources available for the UL-SRS. At step 1108, the enhanced repeater may configure the target UE with one or more UL-SRS resource sets based on the determination of the resources available. In some embodiments, these resources may include time and/or frequency resources as discussed elsewhere herein.

At step 1110, the enhanced repeater may provide the configured UL-SRS information to the LMF.

At step 1112, the enhanced repeater may receive an NRPPa Measurement Request message, which contains information that enables the enhanced repeater TRP to perform uplink measurements with respect to the UE.

Optionally, at step 1114, in embodiments in which the UL-SRS is semi-persistent or aperiodic, the enhanced repeater may receive a request to activate or trigger the UL-SRS in the UE.

Otherwise, at step 1116, the enhanced repeater may provide downlink positioning signals to at least the target UE. The positioning signals may include DL-PRS generated by the DU functionality of the enhanced repeater. In some embodiments, the enhanced repeater may provide positioning signals to other UE(s) the enhanced repeater is serving.

At step 1118, the enhanced repeater may receive uplink positioning signals (e.g., UL-SRS) from the target UE(s) via the DU functionality, and perform uplink measurements based on the received uplink positioning signals (e.g., UL-SRS).

At step 1120, the enhanced repeater may report the uplink measurements to the LMF via at least one neighboring gNB, enabling (at step 1122) the LMF to (i) determine RTTs from the UE(s) and Rx-Tx time difference measurements for the TRP of the enhanced repeater from which downlink measurements were provided (at step 1116) and to which uplink measurements were received (at step 1118), and (ii) calculate the position(s) of the target UE(s). Such calculated position will have fewer (if any) errors relating to delays caused by multiple nodes (e.g., gNBs) in the network because the positioning signal is measured between the UE(s) and the enhanced repeater (with DU and UE capabilities) rather than with an upstream gNB relaying the positioning signal.

Figure 12:
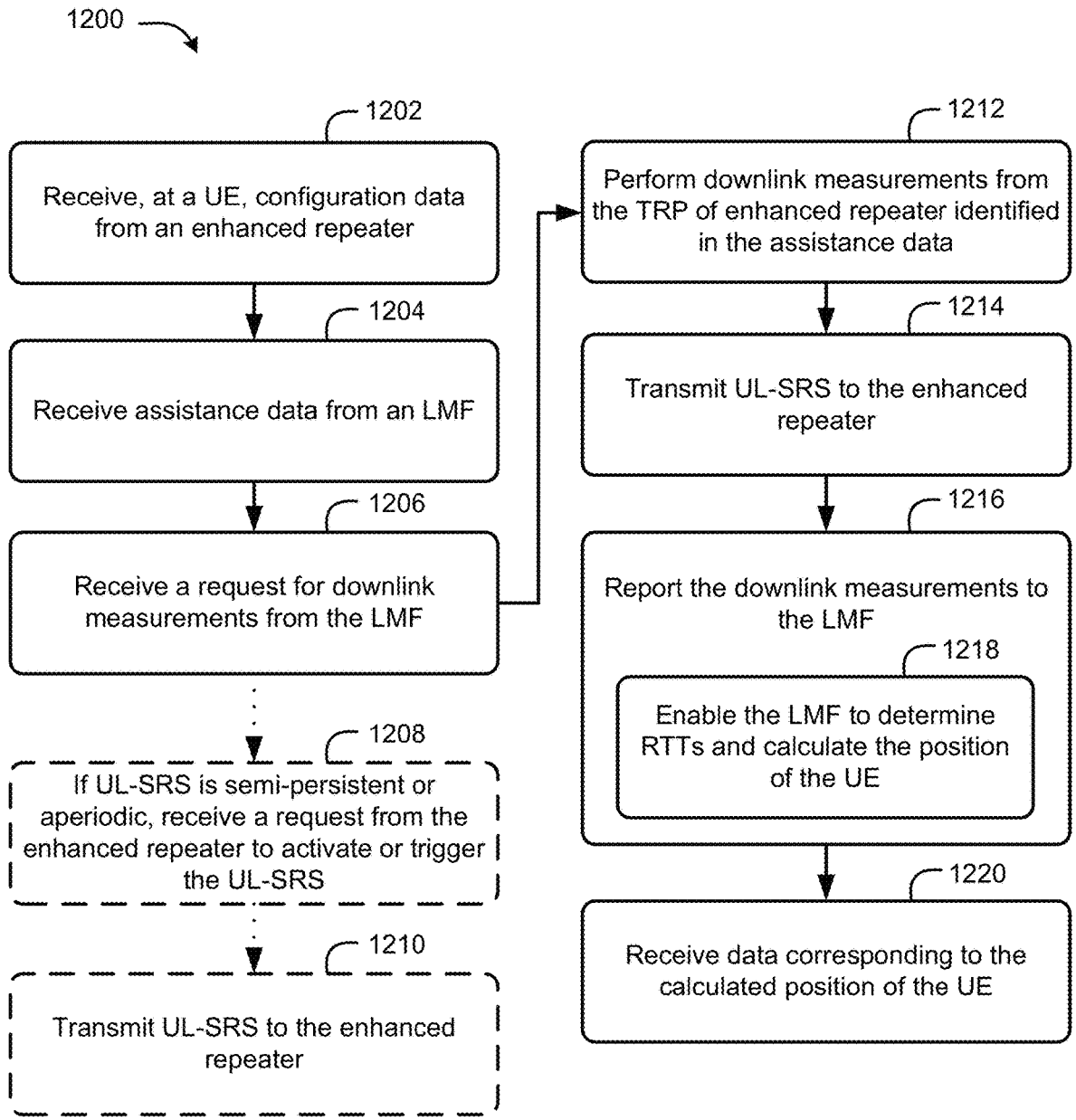
FIG. 12 illustrates a flow diagram of a method for positioning of a UE via an enhanced repeater, according to one embodiment.

FIG. 12 is a flow diagram of a method 1200 for positioning of a UE via an enhanced repeater (e.g. 602), according to one embodiment. A computer-readable apparatus including a storage medium may store computer-readable and computer-executable instructions that are configured to, when executed by at least one processor apparatus, cause the at least one processor apparatus or another apparatus (e.g., the UE) to perform the operations of the method 1200. It should be noted that the operations of the method 1200 may be performed in any suitable order, not necessarily the order depicted in FIG. 12. Further, the method 1200 may include additional or fewer operations than those depicted in FIG. 12 to accomplish the UE positioning. The operations of method 1200 may be performed by a computerized device or system (e.g., the target UE shown in FIGS. 1-9). More directly, means for performing the functionality illustrated in one or more of the steps FIG. 12 may be performed by hardware and/or software components of the above-mentioned computerized device or system. Such components are described elsewhere below with respect to FIGS. 13-15.

At step 1202 of the method 1200, a user device (e.g., UE 105) may receive configuration data from an enhanced repeater (e.g., 602). In some embodiments, the configuration data may include UL-SRS resource sets.

At step 1204, the UE may receive assistance data via an LPP Provide Assistance Data message from an LMF (e.g., LMF 616). The message may include any required assistance data for the UE to perform necessary downlink measurements relative to the enhanced repeater (or its TRP).

At step 1206, the UE may receive a request for downlink measurements via an LPP Request Location Information message from the LMF. In some embodiments, the TRP included in the downlink measurements may include at least the TRP for the enhanced repeater indicated in step 1206.

Optionally, at step 1208, in implementation in which semi-persistent or aperiodic UL-SRS is used, the UE may receive a request from the enhanced repeater to activate or trigger the UL-SRS. In such implementations, at step 1210, the UE may transmit UL-SRS to the enhanced repeater in response to the request to activate the UL-SRS. If such semi-persistent or aperiodic UL-SRS is not used, this step may be omitted.

Otherwise, at step 1212, the UE may perform downlink measurements from the TRP for the enhanced repeater identified in the assistance data from step 1204. More specifically, the UE may receive DL-PRS generated by the DU functionality of the enhanced repeater. In some embodiments, DL-PRS from other neighboring gNBs may be used as additional RTT measurements, e.g., for multi-RTT positioning.

At step 1214, the UE may transmit UL-SRS to at least the enhanced repeater, which may enable the TRP of at least the enhanced repeater to perform uplink measurements based on the transmitted UL-SRS.

At step 1216, the UE may report the downlink measurements to the LMF. More specifically, in some embodiments, the UE may send an LPP Provide Location Information message to the LMF, wherein this message may contain the downlink measurements (i.e., those obtained by the UE at step 1212). These reported measurements may enable (at step 1218) the LMF to (i) determine RTTs from the UE and Rx-Tx time difference measurements for each TRP (including that of the enhanced repeater) for which corresponding uplink and downlink measurements were provided, and (ii) calculate the position of the UE.

At step 1220, the UE may receive data corresponding to the calculated position of the UE. Such calculated position will have fewer (if any) errors relating to delays caused by multiple nodes (e.g., gNBs) in the network because the positioning signal is measured between the UE and the enhanced repeater (i.e., serving gNB with DU and UE capabilities) rather than with an upstream gNB relaying the positioning signal.

Apparatus for Positioning System

Figure 13:
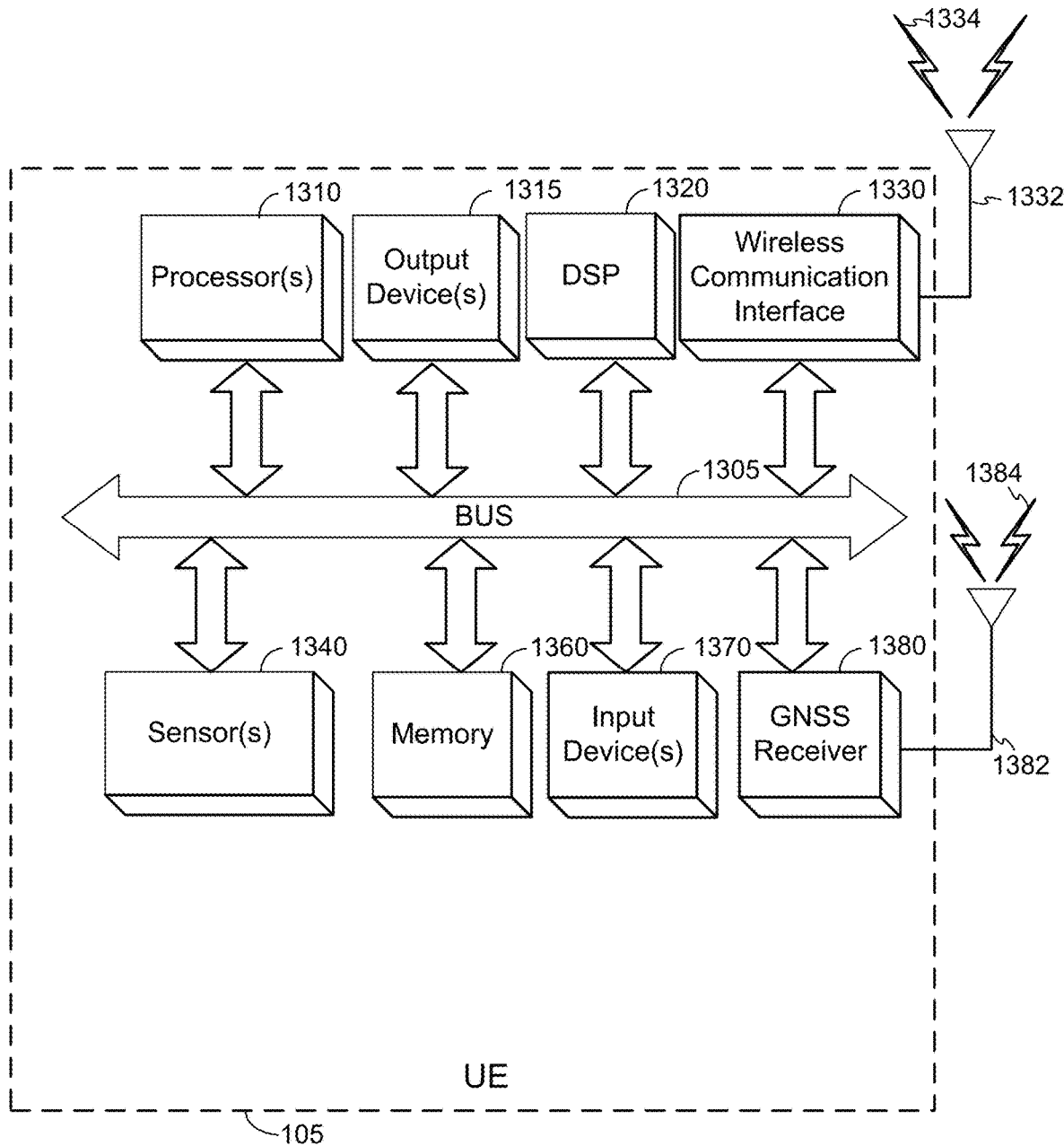
FIG. 13 is a block diagram of an embodiment of a UE, which can be utilized in embodiments as described herein.

FIG. 13 illustrates an embodiment of a UE (e.g., 105), which can be utilized as described herein above. For example, the UE 105 can perform one or more of the functions of the method shown in FIG. 12. It should be noted that FIG. 13 is meant only to provide a generalized illustration of various components, any or all of which may be utilized as appropriate. It can be noted that, in some instances, components illustrated by FIG. 13 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 13.

The UE 105 is shown comprising hardware elements that can be electrically coupled via a bus 1305 (or may otherwise be in communication, as appropriate). The hardware elements may include a processor(s) 1310 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1310 may comprise one or more processing units, which may be housed in a single integrated circuit (IC) or multiple ICs. As shown in FIG. 13, some embodiments may have a separate DSP 1320, depending on desired functionality. Location determination and/or other determinations based on wireless communication may be provided in the processor(s) 1310 and/or wireless communication interface 1330 (discussed below). The UE 105 also can include one or more input devices 1370, which can include without limitation one or more keyboards, touch screens, touch pads, microphones, buttons, dials, switches, and/or the like; and one or more output devices 1315, which can include without limitation one or more displays (e.g., touch screens), light emitting diodes (LEDs), speakers, and/or the like.

The UE 105 may also include a wireless communication interface 1330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 1330 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1332 that send and/or receive wireless signals 1334. According to some embodiments, the wireless communication antenna(s) 1332 may comprise a plurality of discrete antennas, antenna arrays, or any combination thereof. The antenna(s) 1332 may be capable of transmitting and receiving wireless signals using beams (e.g., Tx beams and Rx beams). Beam formation may be performed using digital and/or analog beam formation techniques, with respective digital and/or analog circuitry. The wireless communication interface 1330 may include such circuitry.

Depending on desired functionality, the wireless communication interface 1330 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1340. Sensor(s) 1340 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1380 capable of receiving signals 1384 from one or more GNSS satellites using an antenna 1382 (which could be the same as antenna 1332). Positioning based on GNSS signal measurement can be utilized to complement and/or incorporate the techniques described herein. The GNSS receiver 1380 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1380 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1380 is illustrated in FIG. 13 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1310, DSP 1320, and/or a processor within the wireless communication interface 1330 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1310 or DSP 1320.

The UE 105 may further include and/or be in communication with a memory 1360. The memory 1360 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1360 of the UE 105 also can comprise software elements (not shown in FIG. 13), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1360 that are executable by the UE 105 (and/or processor(s) 1310 or DSP 1320 within UE 105). In some embodiments, then, such code and/or instructions can be used to configure and/or adapt a general-purpose computer (or other device) to perform one or more operations in accordance with the described methods.

Figure 14:
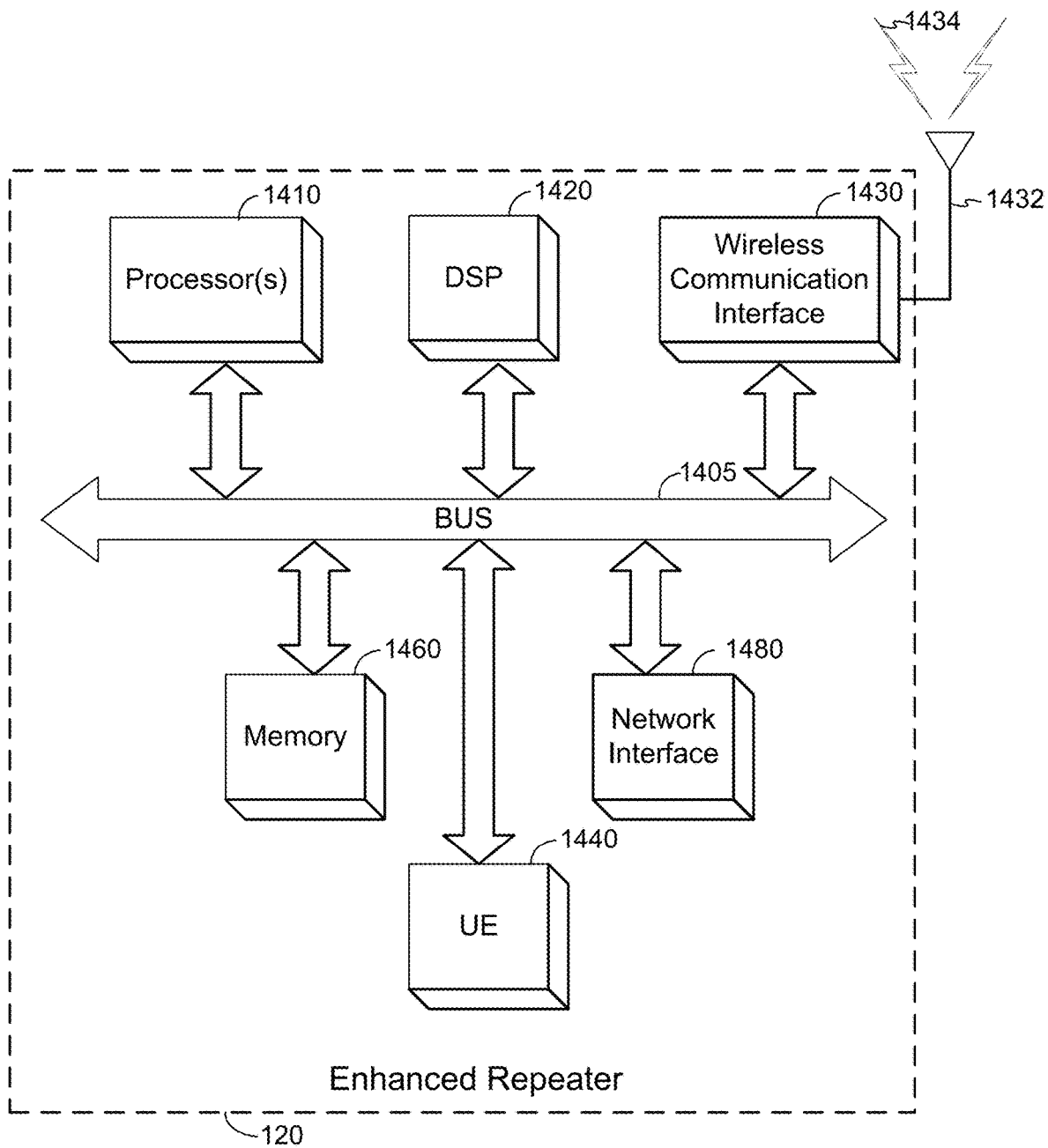
FIG. 14 is a block diagram of an embodiment of an enhanced repeater, which can be utilized in embodiments as described herein.

FIG. 14 illustrates an embodiment of a base station 120, which can be utilized as described herein above (e.g., in association with FIGS. 1a-9). It should be noted that FIG. 14 is meant only to provide a generalized illustration of various components, any or all of which may be utilized as appropriate. In some embodiments, the base station 120 may correspond to a gNB, an ng-eNB, and/or (more generally) a TRP. More particularly, the base station 120 may be an example of an enhanced repeater as described with respect to FIG. 6 or FIG. 9.

The base station 120 is shown comprising hardware elements that can be electrically coupled via a bus 1405 (or may otherwise be in communication, as appropriate). The hardware elements may include a processor(s) 1410 which can include without limitation one or more general-purpose processors, one or more special-purpose processors (such as DSP chips, graphics acceleration processors, ASICs, and/or the like), and/or other processing structure or means. As shown in FIG. 14, some embodiments may have a separate DSP 1420, depending on desired functionality. Location determination and/or other determinations based on wireless communication may be provided in the processor(s) 1410 and/or wireless communication interface 1430 (discussed below), according to some embodiments.

Moreover, UE functionality 1440 may be present as hardware and/or software components, useful for various embodiments described above when used in conjunction with the other components (e.g., DU) of the base station 120 in the manner described herein. For example, in some embodiments, the UE functionality 1440 may be executed (as software or via a protocol stack) by one or more processors, such as processor(s) 1410, DSP 1420, and/or a processor within the wireless communication interface 1430 (e.g., in a modem). In some embodiments, the UE functionality 1440 may be embodied in a discrete physical unit or component, e.g., an interface, a modem, or a termination. Hence, the term "UE modem" may refer to a physical portion or component of the enhanced repeater, which may be configured to perform the various operations as described herein in conjunction with the aforementioned network entities and components (e.g., processor(s)).

The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 1430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 1430 may include a transceiver and may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1432 that send and/or receive wireless signals 1434.

The base station 120 may also include a network interface 1480, which can include support of wireline communication technologies. The network interface 1480 may include a modem, network card, chipset, and/or the like. The network interface 1480 may include one or more input and/or output communication interfaces to permit data to be exchanged with a network, communication network servers, computer systems, and/or any other electronic devices described herein.

In many embodiments, the base station 120 may further comprise a memory 1460. The memory 1460 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1460 of the base station 120 also may comprise software elements (not shown in FIG. 14), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1460 that are executable by the base station 120 (and/or processor(s) 1410 or DSP 1420 within base station 120). In some embodiments, then, such code and/or instructions can be used to configure and/or adapt a general-purpose computer (or other device) to perform one or more operations in accordance with the described methods.

Figure 15:
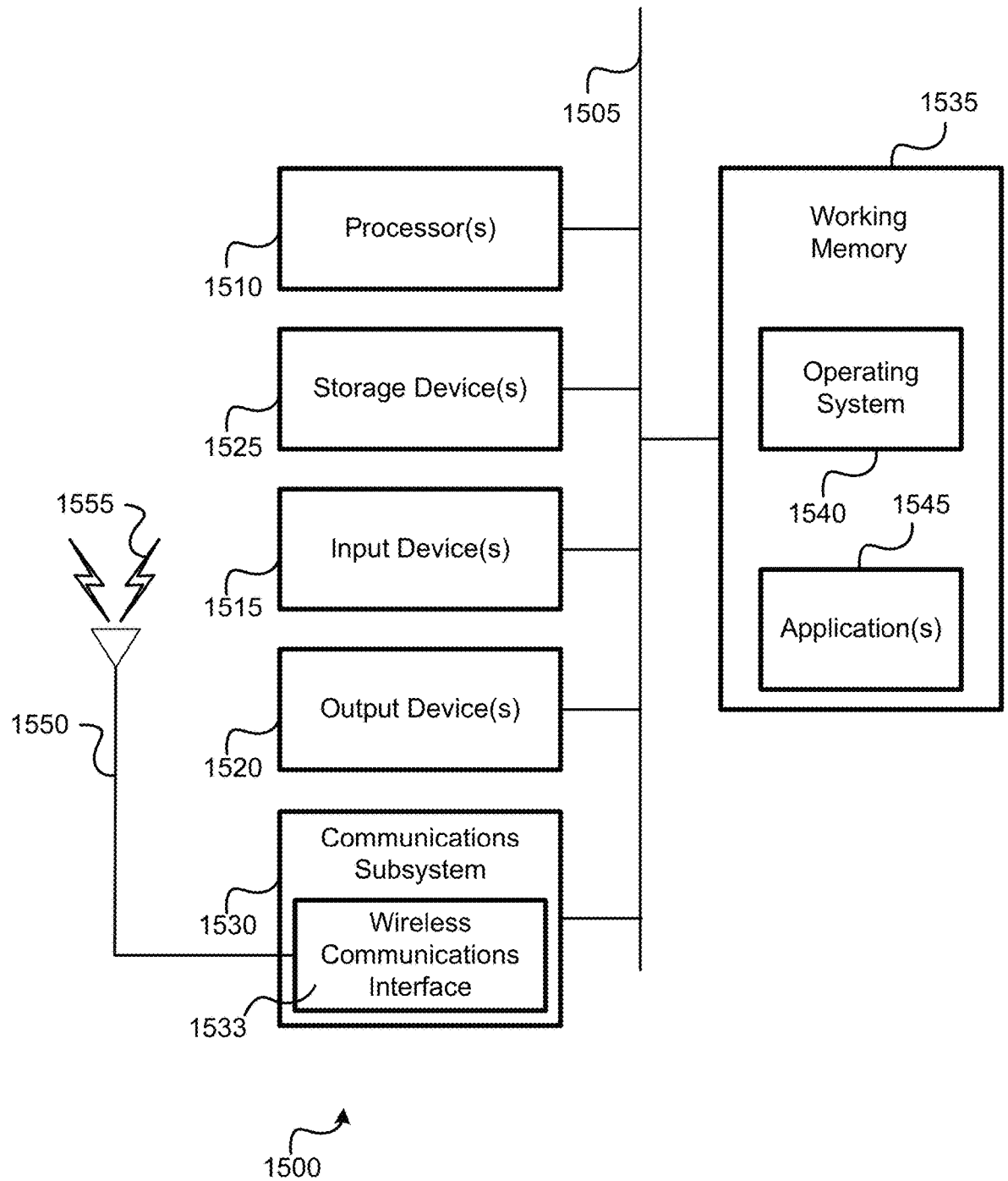
FIG. 15 is a block diagram of an embodiment of a computer system, which can be utilized in embodiments as described herein.

FIG. 15 is a block diagram of an embodiment of a computer system 1500, which may be used, in whole or in part, to provide the functions of one or more network components as described in the embodiments herein (e.g., location server 160 of FIG. 1*a*, LMF 220 of FIG. 2, or LMF 616 of FIG. 6). It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner. In addition, it can be noted that components illustrated by FIG. 15 can be localized to a single device and/or distributed among various networked devices, which may be disposed at different geographical locations.

The computer system 1500 is shown comprising hardware elements that can be electrically coupled via a bus 1505 (or may otherwise be in communication, as appropriate). The hardware elements may include processor(s) 1510, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1500 also may comprise one or more input devices 1515, which may comprise without limitation a mouse, a keyboard, a camera, a microphone, and/or the like; and one or more output devices 1520, which may comprise without limitation a display device, a printer, and/or the like.

The computer system 1500 may further include (and/or be in communication with) one or more non-transitory storage devices 1525, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1500 may also include a communications subsystem 1530, which may comprise wireless communication technologies managed and controlled by a wireless communication interface 1533, as well as wired technologies (such as Ethernet, coaxial communications, universal serial bus (USB), and the like). The wireless communication interface 1533 may comprise one or more wireless transceivers may send and receive wireless signals 1555 (e.g., signals according to 5G NR or LTE) via wireless antenna(s) 1550. Thus the communications subsystem 1530 may comprise a modem, a network card (wireless or wired), an infrared communication device, a wireless communication device, and/or a chipset, and/or the like, which may enable the computer system 1500 to communicate on any or all of the communication networks described herein to any device on the respective network, including a User Equipment (UE), base stations and/or other TRPs, and/or any other electronic devices described herein. Hence, the communications subsystem 1530 may be used to receive and send data as described in the embodiments herein.

In many embodiments, the computer system 1500 will further comprise a working memory 1535, which may comprise a RAM or ROM device, as described above.

Software elements, shown as being located within the working memory 1535, may comprise an operating system 1540, device drivers, executable libraries, and/or other code, such as one or more applications 1545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1525 described above. In some cases, the storage medium might be incorporated within a computer system, such as computer system 1500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method for positioning a target user equipment (UE) to be served by an enhanced repeater of a wireless-enabled network, the enhanced repeater comprising a user equipment (UE) modem and a distributed unit (DU), the method comprising: performing setup with a location management function (LMF) of the network using the UE modem of the enhanced repeater; providing one or more downlink positioning signals generated by the DU of the enhanced repeater to the target UE; receiving one or more uplink positioning signals from the target UE via the DU of the enhanced repeater; performing one or more uplink measurements based on the received one or more uplink positioning signals; and reporting the one or more uplink measurements to the LMF via a gNodeB (gNB), the one or more uplink measurements configured to enable the LMF to determine a position of the target UE.

Clause 2: The method of clause 1, wherein the one or more downlink positioning signals comprise one or more downlink Positioning Reference Signals (DL-PRS).

Clause 3: The method of any of clauses 1-2 wherein the one or more uplink positioning signals from the target UE comprise one or more uplink Sounding Reference Signals (UL-SRS).

Clause 4: The method of any of clauses 1-3 further comprising receiving a request from the LMF for configuration information for the target UE; determining resources available for the one or more uplink positioning signals; and configuring the target UE with a resource set based on the determining of the resources available.

Clause 5: The method of any of clauses 1-4 wherein the configuration information comprises uplink Sounding Reference Signals (UL-SRS) configuration information.

Clause 6: The method of any of clauses 1-5 wherein the performing of the setup with the LMF comprises transmitting a message to the LMF, the message configured to indicate to the LMF that the enhanced repeater is capable of positioning.

Clause 7: The method of any of clauses 1-6 wherein the performing of the setup with the LMF further comprises: performing setup to enable the DU of the enhanced repeater; and performing setup for an interface between the enhanced repeater and the gNB.

Clause 8: The method of any of clauses 1-7 further comprising transmitting one or more signals via Physical Downlink Control Channel (PDCCH), Physical Downlink Shared Channel (PDSCH), Physical Uplink Control Channel (PUCCH), Physical Uplink Shared Channel (PUSCH), or a combination thereof.

Clause 9: The method of any of clauses 1-8 wherein the gNB comprises a serving gNB configured to be in data communication with at least the enhanced repeater and the LMF.

Clause 10: An enhanced repeater, comprising: at least one wireless communication interface; memory; a distributed unit (DU); a user equipment (UE) modem; and one or more processors communicatively coupled to the at least one wireless communication interface, the DU, the UE modem, and the memory, and configured to: perform setup with a location management function (LMF) of a network using the UE modem of the enhanced repeater; provide one or more downlink positioning signals generated by the DU of the enhanced repeater to a target UE to be served by the enhanced repeater; receive one or more uplink positioning signals from the target UE via the DU of the enhanced repeater; perform one or more uplink measurements based on the received one or more uplink positioning signals; and report the one or more uplink measurements to the LMF via a gNodeB (gNB), the one or more uplink measurements configured to enable the LMF to determine a position of the target UE.

Clause 11: The enhanced repeater of clause 10, wherein the DU of the enhanced repeater is configured for data communication with a central unit (CU) of the gNB, the CU being configured to perform data communication with the LMF.

Clause 12: The enhanced repeater of any of clauses 10-11 wherein the DU of the enhanced repeater is configured for data communication with an access and mobility management functions (AMF) via an N2 interface.

Clause 13: The enhanced repeater of any of clauses 10-12 wherein the one or more downlink positioning signals comprise one or more downlink Positioning Reference Signals (DL-PRS); and wherein the one or more uplink positioning signals from the target UE comprise one or more uplink Sounding Reference Signals (UL-SRS).

Clause 14: The enhanced repeater of any of clauses 10-13 wherein the one or more processors are further configured to: receive a request from the LMF for configuration information for the target UE; determine resources available for the one or more uplink positioning signals; and configure the target UE with a resource set based on the determination of the resources available.

Clause 15: The enhanced repeater of any of clauses 10-14 wherein the UE modem of the enhanced repeater is configured for data communication with the LMF via a user plane.

Clause 16: The enhanced repeater of any of clauses 10-15 wherein the one or more processors are further configured to receive a NR Positioning Protocol A (NRPPa) message from the LMF.

Clause 17: The enhanced repeater of any of clauses 10-16 wherein the performing of the setup with the LMF comprises transmitting a message to the LMF, the message configured to indicate to the LMF that the enhanced repeater is capable of positioning; and wherein the performing of the setup with the LMF further comprises: performing setup to enable the DU of the enhanced repeater; and performing setup for an interface between the enhanced repeater and the gNB.

Clause 18: The enhanced repeater of any of clauses 10-17 wherein the one or more processors are further configured to transmit one or more signals via Physical Downlink Control Channel (PDCCH), Physical Downlink Shared Channel (PDSCH), Physical Uplink Control Channel (PUCCH), Physical Uplink Shared Channel (PUSCH), or a combination thereof.

Clause 19: The enhanced repeater of any of clauses 10-18 wherein the gNB comprises a serving gNB configured to be in data communication with at least the enhanced repeater and the LMF.

Clause 20: A non-transitory computer-readable apparatus comprising a storage medium, the storage medium comprising a plurality of instructions configured to, when executed by one or more processors, cause an enhanced repeater to: perform setup with a location management function (LMF) of a network using a user equipment (UE) modem of the enhanced repeater; provide one or more downlink positioning signals generated by a distributed unit (DU) of the enhanced repeater to a target UE to be served by the enhanced repeater; receive one or more uplink positioning signals from the target UE via the DU of the enhanced repeater; perform one or more uplink measurements based on the received one or more uplink positioning signals; and report the one or more uplink measurements to the LMF via a gNodeB (gNB), the one or more uplink measurements configured to enable the LMF to determine a position of the target UE.

Clause 21: The non-transitory computer-readable apparatus of clause 20, wherein: the one or more downlink positioning signals comprise one or more downlink Positioning Reference Signals (DL-PRS); and the one or more uplink positioning signals from the target UE comprise one or more uplink Sounding Reference Signals (UL-SRS).

Clause 22: The non-transitory computer-readable apparatus of any of clauses 20-21 wherein the plurality of instructions are further configured to, when executed by the one or more processors, cause the enhanced repeater to: receive a request from the LMF for configuration information for the target UE; determine resources available for the one or more uplink positioning signals; and configure the target UE with a resource set based on the determination of the resources available.

Clause 23: The non-transitory computer-readable apparatus of any of clauses 20-22 wherein the performing of the setup with the LMF comprises transmitting a message to the LMF, the message configured to indicate to the LMF that the enhanced repeater is capable of positioning.

Clause 24: The non-transitory computer-readable apparatus of any of clauses 20-23 wherein the performing of the setup with the LMF further comprises: performing setup to enable the DU of the enhanced repeater; and performing setup for an interface between the enhanced repeater and the gNB.

Clause 25: The non-transitory computer-readable apparatus of any of clauses 20-24 wherein the gNB comprises a serving gNB configured to be in data communication with at least the enhanced repeater and the LMF.

Clause 26: An enhanced repeater, comprising: means for performing setup with a location management function (LMF) of a network using a user equipment (UE) modem of the enhanced repeater; means for providing one or more downlink positioning signals generated by a distributed unit (DU) of the enhanced repeater to a target UE; means for receiving one or more uplink positioning signals from the target UE via the DU of the enhanced repeater; means for performing one or more uplink measurements based on the received one or more uplink positioning signals; and means for reporting the one or more uplink measurements to the LMF via a gNodeB (gNB), the one or more uplink measurements configured to enable the LMF to determine a position of the target UE.

Clause 27: The enhanced repeater of clause 26, wherein: the one or more downlink positioning signals comprise one or more downlink Positioning Reference Signals (DL-PRS); and the one or more uplink positioning signals from the target UE comprise one or more uplink Sounding Reference Signals (UL-SRS).

Clause 28: The enhanced repeater of any of clauses 26-27 further comprising means for receiving a request from the LMF for configuration information for the target UE; means for determining resources available for the one or more uplink positioning signals; and means for configuring the target UE with a resource set based on the determining of the resources available.

Clause 29: The enhanced repeater of any of clauses 26-28 wherein the means for performing setup with the LMF comprises: means for transmitting a message to the LMF, the message configured to indicate to the LMF that the enhanced repeater is capable of positioning; means for performing setup to enable the DU of the enhanced repeater; and means for performing setup for an interface between the enhanced repeater and the gNB.

Clause 30: The enhanced repeater of any of clauses 26-29 wherein the gNB comprises a serving gNB configured to be in data communication with at least the enhanced repeater and the LMF.

What is claimed is:

1. A method for positioning a target user equipment (UE) to be served by an enhanced repeater of a network, the enhanced repeater comprising a user equipment (UE) modem and a distributed unit (DU), the method comprising:

performing setup with a location management function (LMF) of the network using the UE modem of the enhanced repeater;

providing one or more downlink positioning signals generated by the DU of the enhanced repeater to the target UE, the DU configured to receive a measurement request from the LMF via NR Positioning Protocol A (NRPPa) or an F1 interface of the DU;

receiving one or more uplink positioning signals from the target UE via the DU of the enhanced repeater;

performing one or more uplink measurements via the DU of the enhanced repeater based on the received one or more uplink positioning signals from the target UE and based on the measurement request; and reporting the one or more uplink measurements to the LMF via a gNodeB (gNB), the one or more uplink measurements configured to enable the LMF to determine a position of the target UE.

2. The method of claim 1, wherein the one or more downlink positioning signals comprise one or more downlink Positioning Reference Signals (DL-PRS).

3. The method of claim 1, wherein the one or more uplink positioning signals from the target UE comprise one or more uplink Sounding Reference Signals (UL-SRS).

4. The method of claim 1, further comprising:
receiving a request from the LMF for configuration information for the target UE;
determining resources available for the one or more uplink positioning signals; and
configuring the target UE with a resource set based on the determining of the resources available.

5. The method of claim 4, wherein the configuration information comprises uplink Sounding Reference Signals (UL-SRS) configuration information.

6. The method of claim 1, wherein the performing of the setup with the LMF comprises transmitting a message to the LMF, the message configured to indicate to the LMF that the enhanced repeater is capable of positioning.

7. The method of claim 6, wherein the performing of the setup with the LMF further comprises:
performing setup to enable the DU of the enhanced repeater; and
performing setup for an interface between the enhanced repeater and the gNB.

8. The method of claim 1, further comprising transmitting one or more signals via Physical Downlink Control Channel (PDCCH), Physical Downlink Shared Channel (PDSCH), Physical Uplink Control Channel (PUCCH), Physical Uplink Shared Channel (PUSCH), or a combination thereof.

9. The method of claim 1, wherein the gNB comprises a serving gNB configured to be in data communication with at least the enhanced repeater and the LMF.

10. An enhanced repeater, comprising:
at least one wireless communication interface;
memory;
a distributed unit (DU);
a user equipment (UE) modem; and
one or more processors communicatively coupled to the at least one wireless communication interface, the DU, the UE modem, and the memory, and configured to:
perform setup with a location management function (LMF) of a network using the UE modem of the enhanced repeater;
provide one or more downlink positioning signals generated by the DU of the enhanced repeater to a target UE to be served by the enhanced repeater, the DU configured to receive a measurement request from the LMF via NR Positioning Protocol A (NRPPa) or an F1 interface of the DU;
receive one or more uplink positioning signals from the target UE via the DU of the enhanced repeater;
perform one or more uplink measurements based on the received one or more uplink positioning signals from the target UE and based on the measurement request; and
report the one or more uplink measurements to the LMF via a gNodeB (gNB), the one or more uplink measurements configured to enable the LMF to determine a position of the target UE.

11. The enhanced repeater of claim 10, wherein the DU of the enhanced repeater is configured for data communication with a central unit (CU) of the gNB, the CU being configured to perform data communication with the LMF.

12. The enhanced repeater of claim 10, wherein the DU of the enhanced repeater is configured for data communication with an access and mobility management functions (AMF) via an N2 interface.

13. The enhanced repeater of claim 10, wherein the one or more downlink positioning signals comprise one or more downlink Positioning Reference Signals (DL-PRS); and
wherein the one or more uplink positioning signals from the target UE comprise one or more uplink Sounding Reference Signals (UL-SRS).

14. The enhanced repeater of claim 10, wherein the one or more processors are further configured to:
receive a request from the LMF for configuration information for the target UE;
determine resources available for the one or more uplink positioning signals; and
configure the target UE with a resource set based on the determination of the resources available.

15. The enhanced repeater of claim 10, wherein the UE modem of the enhanced repeater is configured for data communication with the LMF via a user plane.

16. The enhanced repeater of claim 10, wherein the measurement request from the LMF comprises configuration information enabling the DU to perform the one or more uplink measurements.

17. The enhanced repeater of claim 10, wherein the performing of the setup with the LMF comprises transmitting a message to the LMF, the message configured to indicate to the LMF that the enhanced repeater is capable of positioning; and
wherein the performing of the setup with the LMF further comprises:
performing setup to enable the DU of the enhanced repeater; and
performing setup for an interface between the enhanced repeater and the gNB.

18. The enhanced repeater of claim 10, wherein the one or more processors are further configured to transmit one or more signals via Physical Downlink Control Channel (PDCCH), Physical Downlink Shared Channel (PDSCH), Physical Uplink Control Channel (PUCCH), Physical Uplink Shared Channel (PUSCH), or a combination thereof.

19. The enhanced repeater of claim 10, wherein the gNB comprises a serving gNB configured to be in data communication with at least the enhanced repeater and the LMF.

20. A non-transitory computer-readable apparatus comprising a storage medium, the storage medium comprising a plurality of instructions configured to, when executed by one or more processors, cause an enhanced repeater to:
perform setup with a location management function (LMF) of a network using a user equipment (UE) modem of the enhanced repeater;
provide one or more downlink positioning signals generated by a distributed unit (DU) of the enhanced repeater to a target UE to be served by the enhanced repeater, the DU configured to receive a measurement request from the LMF via NR Positioning Protocol A (NRPPa) or an F1 interface of the DU;
receive one or more uplink positioning signals from the target UE via the DU of the enhanced repeater;
perform one or more uplink measurements based on the received one or more uplink positioning signals from the target UE and based on the measurement request; and
report the one or more uplink measurements to the LMF via a gNodeB (gNB), the one or more uplink measurements configured to enable the LMF to determine a position of the target UE.

21. The non-transitory computer-readable apparatus of claim 20, wherein:
the one or more downlink positioning signals comprise one or more downlink Positioning Reference Signals (DL-PRS); and
the one or more uplink positioning signals from the target UE comprise one or more uplink Sounding Reference Signals (UL-SRS).

22. The non-transitory computer-readable apparatus of claim 20, wherein the plurality of instructions are further configured to, when executed by the one or more processors, cause the enhanced repeater to:
receive a request from the LMF for configuration information for the target UE;
determine resources available for the one or more uplink positioning signals; and
configure the target UE with a resource set based on the determination of the resources available.

23. The non-transitory computer-readable apparatus of claim 20, wherein the performing of the setup with the LMF comprises transmitting a message to the LMF, the message configured to indicate to the LMF that the enhanced repeater is capable of positioning.

24. The non-transitory computer-readable apparatus of claim 23, wherein the performing of the setup with the LMF further comprises:
performing setup to enable the DU of the enhanced repeater; and
performing setup for an interface between the enhanced repeater and the gNB.

25. The non-transitory computer-readable apparatus of claim 20, wherein the gNB comprises a serving gNB configured to be in data communication with at least the enhanced repeater and the LMF.

26. An enhanced repeater, comprising:
means for performing setup with a location management function (LMF) of a network using a user equipment (UE) modem of the enhanced repeater;
means for providing one or more downlink positioning signals generated by a distributed unit (DU) of the enhanced repeater to a target UE, the DU configured to receive a measurement request from the LMF via NR Positioning Protocol A (NRPPa) or an F1 interface of the DU;
means for receiving one or more uplink positioning signals from the target UE via the DU of the enhanced repeater;

means for performing one or more uplink measurements based on the received one or more uplink positioning signals from the target UE and based on the measurement request; and means for reporting the one or more uplink measurements to the LMF via a gNodeB (gNB), the one or more uplink measurements configured to enable the LMF to determine a position of the target UE.

27. The enhanced repeater of claim 26, wherein:

the one or more downlink positioning signals comprise one or more downlink Positioning Reference Signals (DL-PRS); and the one or more uplink positioning signals from the target UE comprise one or more uplink Sounding Reference Signals (UL-SRS).

28. The enhanced repeater of claim 26, further comprising:

means for receiving a request from the LMF for configuration information for the target UE;

means for determining resources available for the one or more uplink positioning signals; and means for configuring the target UE with a resource set based on the determining of the resources available.

29. The enhanced repeater of claim 26, wherein the means for performing setup with the LMF comprises:

means for transmitting a message to the LMF, the message configured to indicate to the LMF that the enhanced repeater is capable of positioning;

means for performing setup to enable the DU of the enhanced repeater; and means for performing setup for an interface between the enhanced repeater and the gNB.

30. The enhanced repeater of claim 26, wherein the gNB comprises a serving gNB configured to be in data communication with at least the enhanced repeater and the LMF.

* * * * *